United States Patent [19]

Tootell et al.

[11] Patent Number: 4,980,825

[45] Date of Patent: Dec. 25, 1990

[54] SERVO VALVE ANALYZING SYSTEM AND METHOD

[75] Inventors: Terence S. Tootell, Windsor; Keith G. Wilson, Belle River, both of Canada; David R. Shoptaw, Livonia, Mich.

[73] Assignee: Hydro-Craft, Inc., Rochester Hills, Mich.

[21] Appl. No.: 243,638

[22] Filed: Sep. 13, 1988

Related U.S. Application Data

[63] Continuation-in-part of Ser. No. 193,242, May 11, 1988, Pat. No. 4,885,943.

[51] Int. Cl.$^5$ .................. G01F 25/00; G05D 7/06; G06F 11/30
[52] U.S. Cl. ...................... 364/580; 364/510; 364/551.01
[58] Field of Search .............. 364/510, 550, 551.01, 364/579, 580; 73/861.77

[56] References Cited

U.S. PATENT DOCUMENTS

| | | | |
|---|---|---|---|
| 4,694,390 | 9/1987 | Lee | 364/510 X |
| 4,725,964 | 2/1988 | Lloyd et al. | 364/510 X |
| 4,790,233 | 12/1988 | Backe et al. | 364/510 X |
| 4,797,820 | 1/1989 | Wilson et al. | 364/510 X |
| 4,811,252 | 3/1989 | Furuse | 364/580 X |
| 4,885,943 | 12/1989 | Tootell | 73/861.77 |

OTHER PUBLICATIONS

TW Webster Instruments product brochure (12 pages).
Flow Technology, Inc. product brochure for Omniflo Turbine Flow Transducers (3 pages).
Brooks Product Information and Selection Guide, Bulletin SP-110, Sep. 1984 (8 pages).
Omega Engineering, Inc. Flow Measurement and Control Handbook and Encyclopedia, 1985/86, Section F (pages F-1 through F-25).
"Chant Engineering Co. Servo Valve Troubleshooting Kit," *Hydraulics and Pneumatics Magazine*, p. 12 (Mar. 1988).
Flo-Tech, Inc. product literature, 25 pages.

*Primary Examiner*—Felix D. Gruber
*Attorney, Agent, or Firm*—Harness, Dickey & Pierce

[57] ABSTRACT

A portable electrohydraulic servo valve analyzer, which has microprocessor-based electronic controller and is operable in a fully automatic mode and a manual mode, is disclosed. The system also includes: a hydraulic manifold block and an adapter block for receiving different servo valve; a servo amplifier and electrical hook-up to the servo valve; pressure gages and hydraulic shut-off valves; a keypad for entering operating input commands and values; two digital displays indicating the current supplied to the valve and the resulting hydraulic flow rate through the valve, and a special turbine flowmeter capable of highly accurate operation of at least three orders of magnitude of flow rates. Most of the system is housed in a single small portable aluminum suitcase. Hydraulic flow is measured by digitally timing the periods between detection of the successive rotating vanes of the turbine, and compensating for nonlinearities in turbine rotation rate at low flows. An optional x-y plotter which may be housed in another suitcase is used in the automatic mode to produce a hard copy of the test results showing the hydraulic flow rate through the servo valve as a function of DC current signal that varies with time and is supplied as an input signal to the valve. This input signal is preferably varied automatically in a manner that puts the valve through a test cycle including its full range of operation. Thus, the test results indicate whether the servo valve is operating properly or needs re-calibration or repair. Preferred methods for operating this servo valve analyzing system are also disclosed.

21 Claims, 7 Drawing Sheets

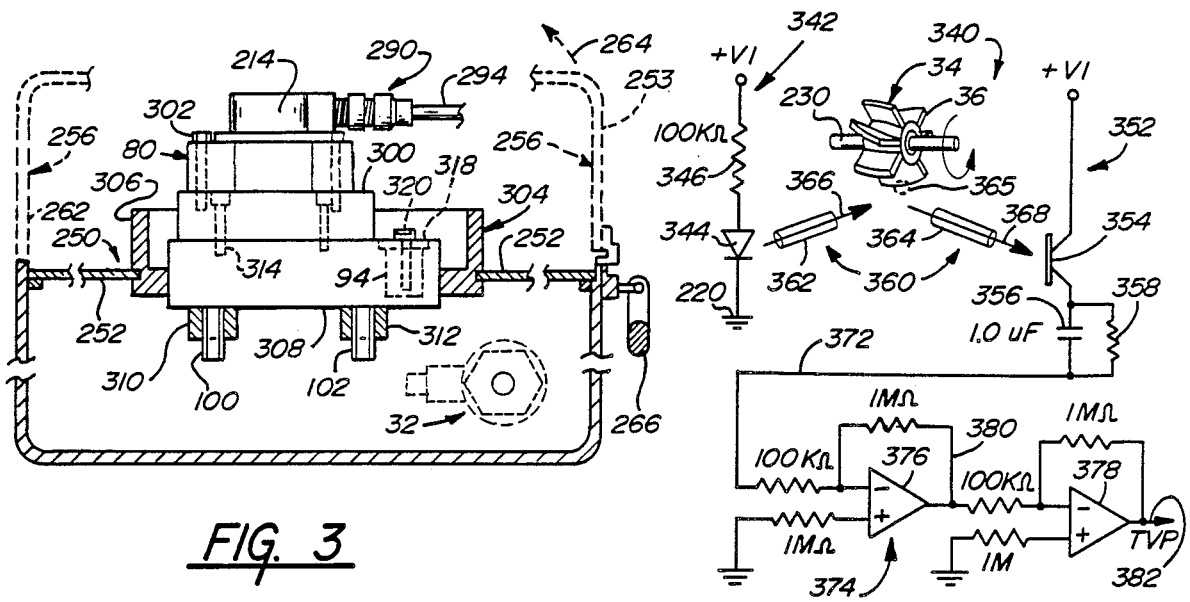
FIG. 3
FIG. 4
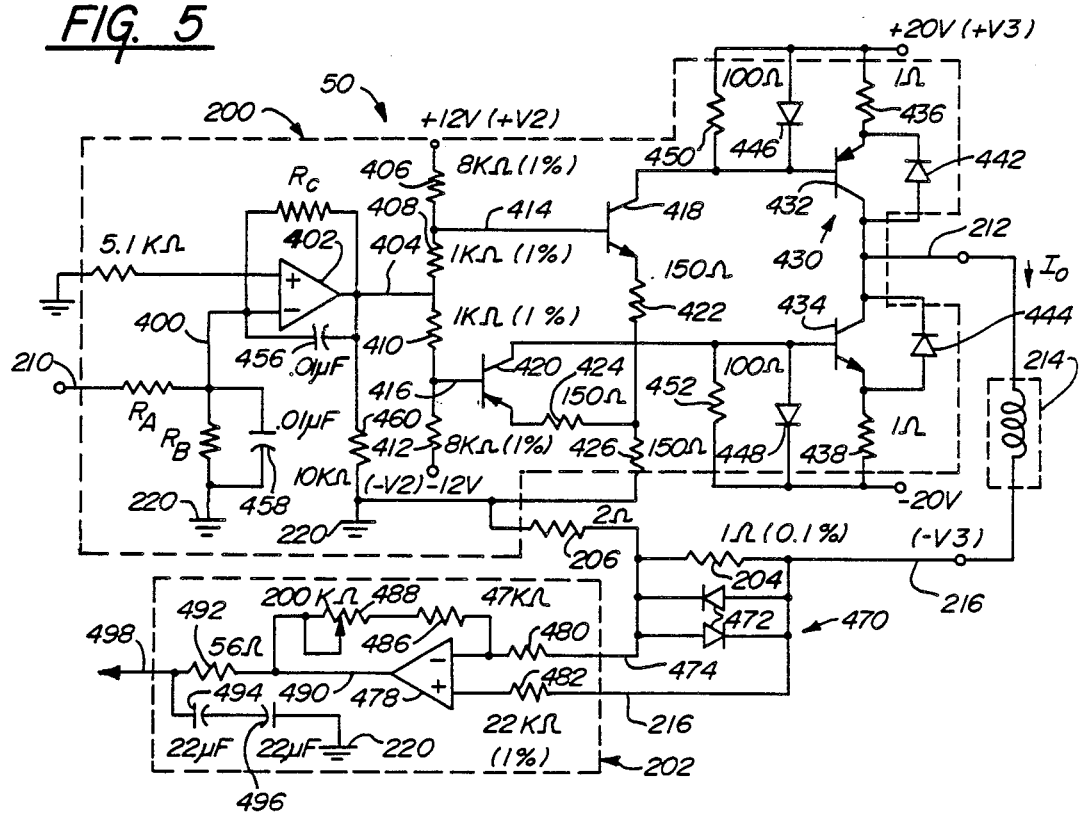
FIG. 5

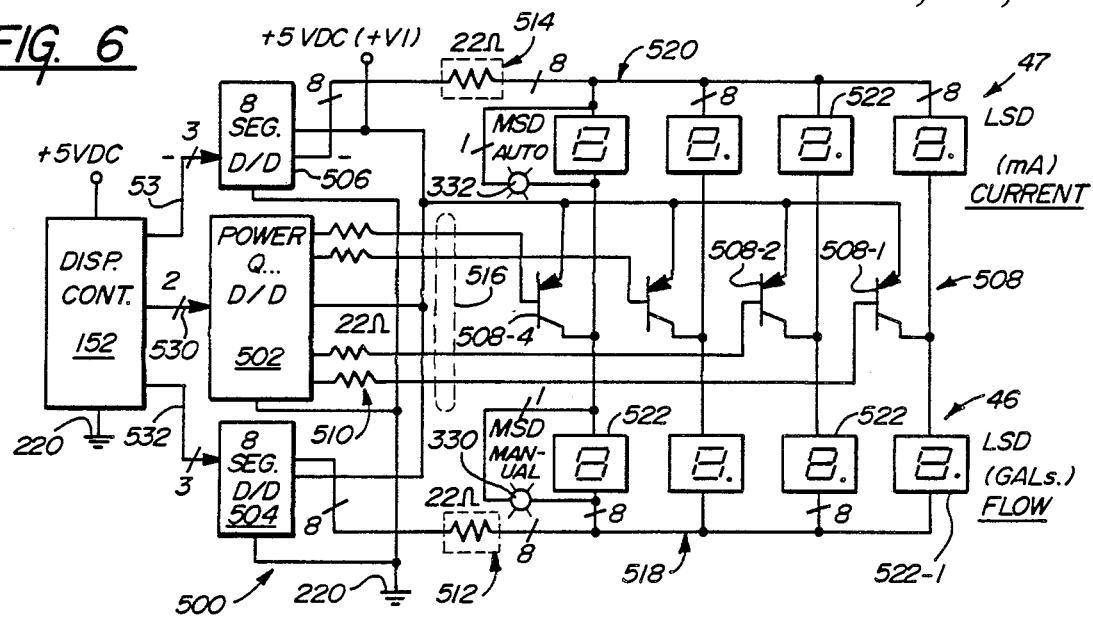
FIG. 6
| ROW NO.(i) | RANGE (IN GPM) | MAX fv (IN Hz) | MAX FPS (IN Hz) | MIN. CCN | LIN. APPROX. VALUE (LA) | FIFO SIZE (M) |
|---|---|---|---|---|---|---|
| 1 | 0.1 TO 0.5 | 2.2 | 0.366 | 1,363,636 | 670,000 | 3 |
| 2 | 0.5 TO 1.0 | 4.4 | 0.733 | 681,818 | 670,000 | 4 |
| 3 | 1.0 TO 1.5 | 6.7 | 1.116 | 447,761 | 670,000 | 5 |
| 4 | 1.5 TO 2.5 | 12.1 | 2.016 | 247,934 | 615,000 | 6 |
| 5 | 2.5 TO 3.5 | 17.5 | 2.916 | 174,429 | 605,000 | 7 |
| 6 | 3.5 TO 4.0 | 20.0 | 3.33 | 150,000 | 600,000 | 8 |
| 7 | 4.0 TO 6.0 | 30.7 | 5.116 | 97,720 | 585,000 | 9 |
| 8 | 6.0 TO 8.0 | 41.0 | 6.83 | 73,171 | 585,000 | 10 |
| 9 | 8.0 TO 9.0 | 44.6 | 7.43 | 67,265 | 585,000 | 10 |
| 10 | 9.0 TO 100. | — | — | — | 585,000 | 12 |
FIG. 7
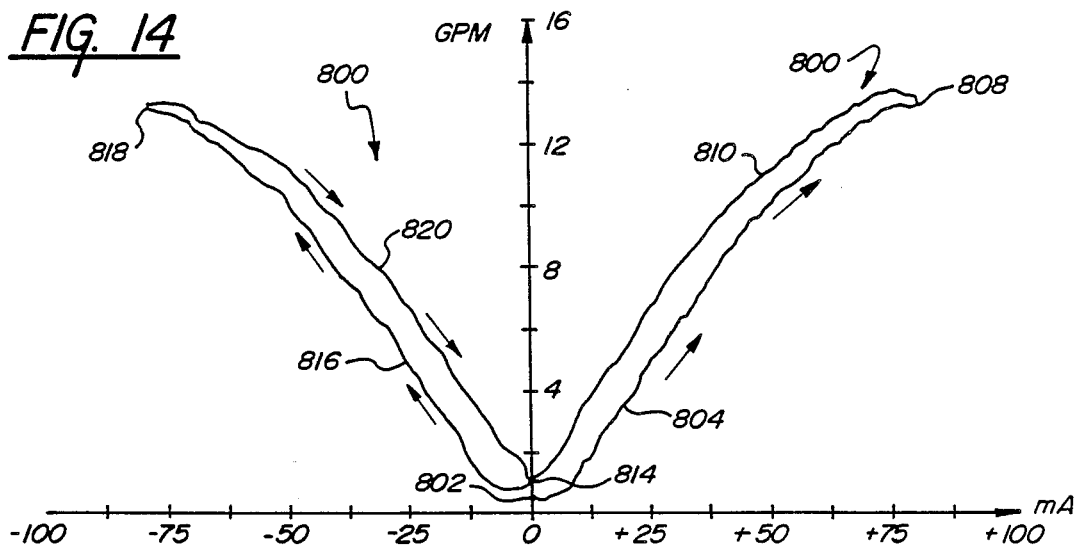
FIG. 14

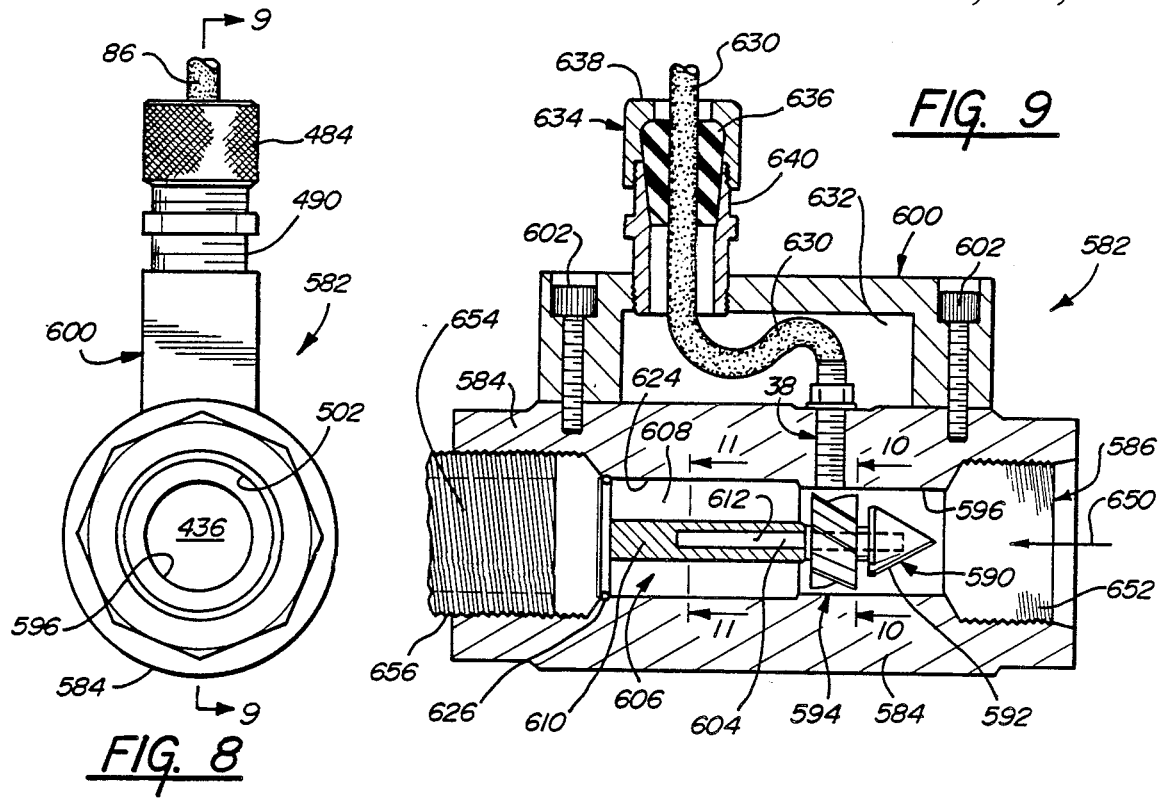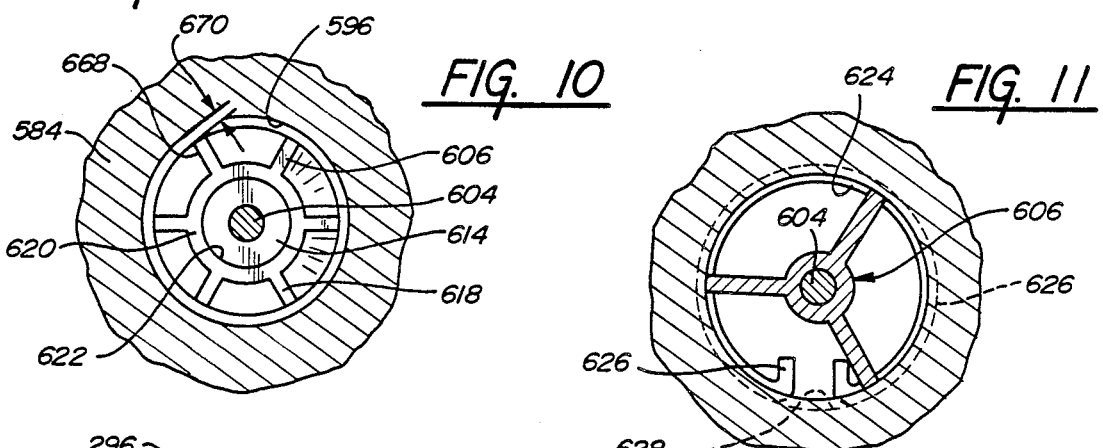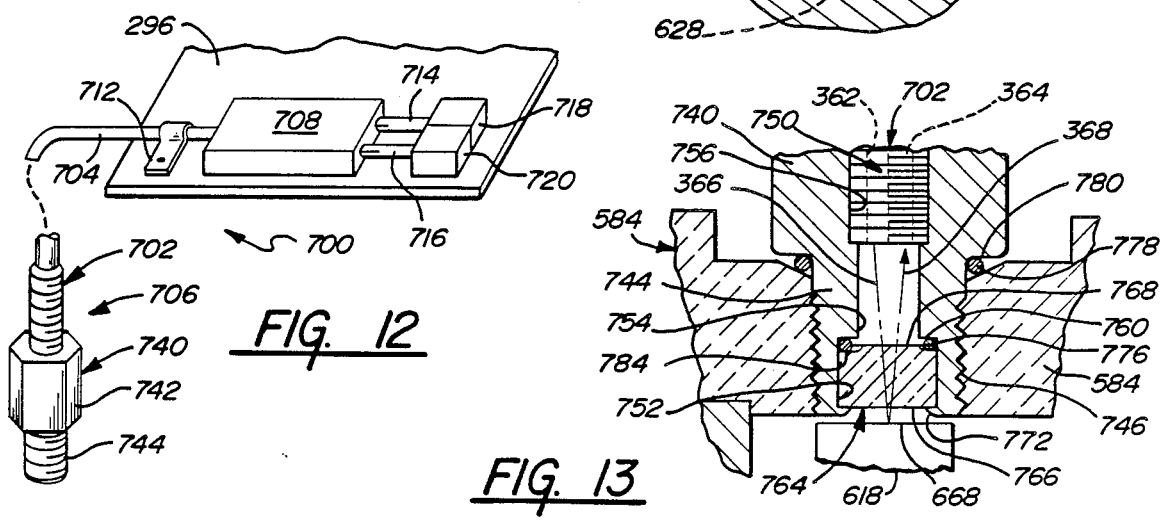

FIG. 15
| GRAPH NO. | mA (max) | GPM (max) | SET $I_S$ (mmA) |
|---|---|---|---|
| 1 | 10 | 16 | 1-10 |
| 2 | 16 | 16 | 11-15 |
| 3 | 16 | 2.5 | 16 |
| 4 | 16 | 10 | 17 |
| 5 | 25 | 16 | 18-25 |
| 6 | 50 | 16 | 26-50 |
| 7 | 50 | 1 | 51 |
| 8 | 100 | 16 | 52-100 |
| 9 | 100 | 10 | 101 |
| 10 | 100 | 5 | 102 |
| 11 | 100 | 1 | 103 |
| 12 | 200 | 16 | 104-200 |
| 13 | 400 | 16 | 201-400 |
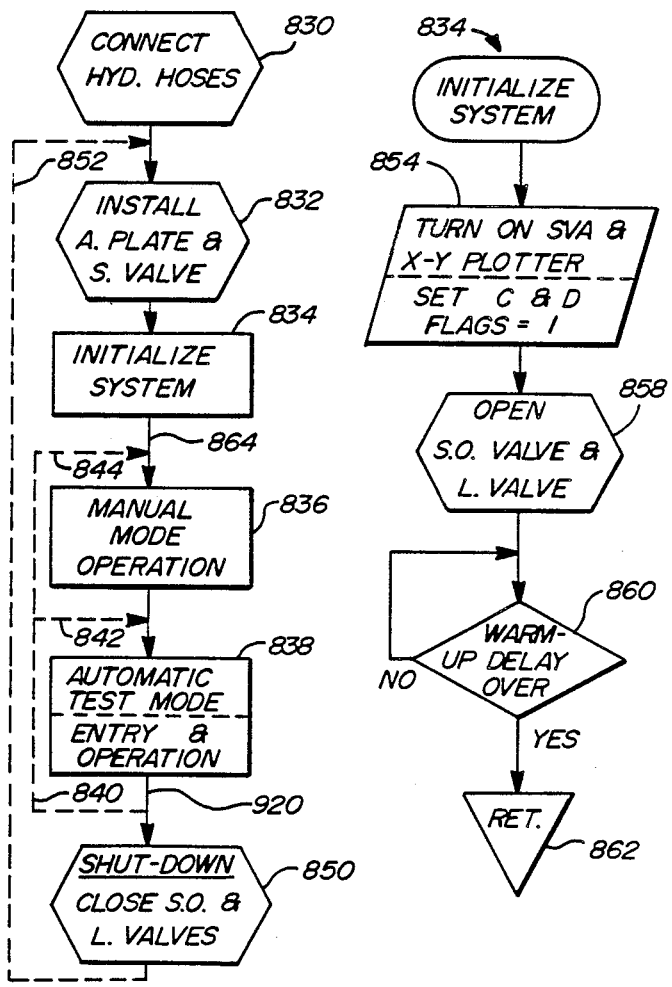
FIG. 16
FIG. 17
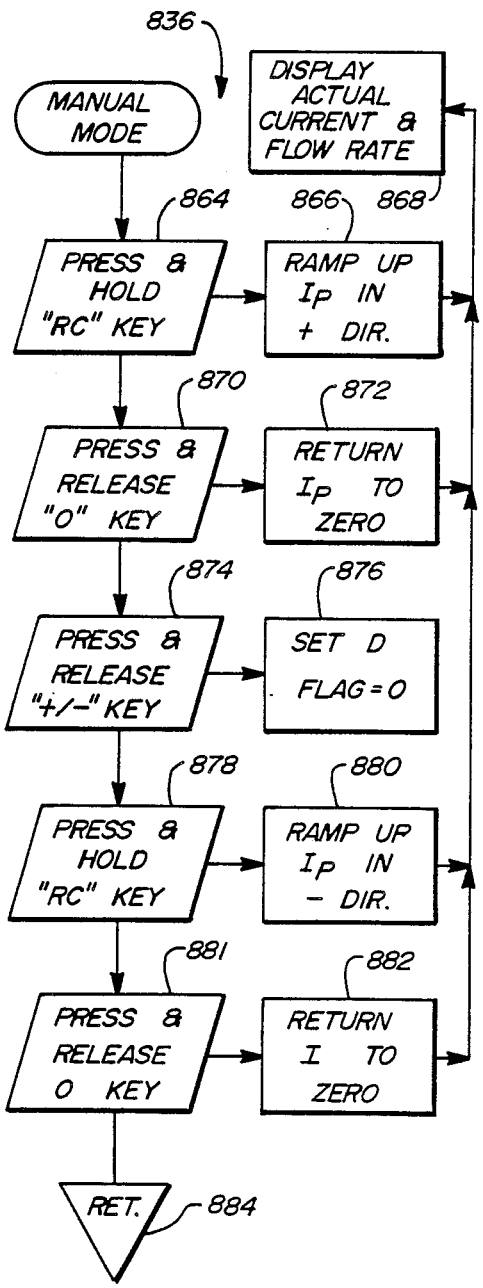
FIG. 18

SERVO VALVE ANALYZING SYSTEM AND METHOD

This application is a continuation-in-part of our co-pending application Ser. No. 07/193,242 filed May 11, 1988 now U.S. Pat. No. 4,885,943 and entitled "Electronic Flowmeter System and Method", which is hereby incorporated herein by reference.

FIELD OF THE INVENTION

This invention relates in general to field test equipment for trouble-shooting electrohydraulic servo control valves at user plants and field repair facilities, and in particular to transportable programmed servo control valve analyzers employing an electronic flowmeter and fully automated test procedures for accurately determining the current-flow characteristics of such valves.

BACKGROUND OF THE INVENTION

Electrohydraulic servo control valves are in wide use in many applications such as mobile agricultural and earth-moving equipment, factory robots, hydraulic power presses, pipe, tube and wire-forming equipment, steel and paper mills, chemical processing plants and machine tools of all types. The use of such valves continues to accelerate, primarily due to the decreased cost, miniaturization and increased reliability of computerized and other electronic servo control systems which are used to control such valves.

Servo system equipment is typically quite complicated and expensive. When it malfunctions for any reason, the equipment is often difficult to service and highly trained repair personnel are required to determine the cause of the malfunction. Accurate diagnosis of the malfunction can be very difficult since the automatic feedback loop always attempts to correct for any perceived error between an input signal and the actual output being produced. Thus, it is often impossible to tell by observation whether a malfunction in a servo system is being caused by an erroneous input signal, a bad feedback transducer, faulty electronics, mechanical trouble with the equipment being controlled, problems with the hydraulic system or with the electrohydraulic servo valve.

The analysis of malfunctions is often exacerbated by the fact that the production equipment on which the servo system is utilized is normally very expensive, and a shutdown of such equipment for several tens of minutes to several hours or more is often very costly. For example, an entire steel plant or paper mill may be shut down when one of its key servo systems is malfunctioning. Thus, there has been a continuing need for better preventive maintenance tests and tools which can be used to prevent, spot and/or correct the cause of such difficulties in servo systems before they become major problems. In particular, there has been a continuing need for tests and tools which can be used for trouble-shooting servo valves in the user's factory or at field repair facilities to quickly and correctly identify whether these complicated components are malfunctioning.

It is well-known that the electrohydraulic servo valve is extremely difficult to check for proper operation due in part to its complexity, sensitivity and wide dynamic range. The mechanical and hydraulic components within the servo valve have rather tight mechanical tolerances and are sensitive to wear, minor mechanical damage, and contamination by debris or other foreign matter within the hydraulic fluid having a size greater than about ten microns (0.0004 inch). Prior to the present invention, there was no reliable low-cost test equipment which existed for use at the average user's factory site that we knew of for determining whether the valve is functioning as it was designed to, or if it is in need of repair or adjustment. So most electrohydraulic servo valves suspected of malfunctioning were simply replaced with a duplicate servo valve, and the original suspect valve is sent out to be repaired or rebuilt in whole or in part.

One of several possible reasons for the lack of any good test equipment for analyzing servo valves is that there are many different types of such servo valves, which have a wide range of maximum flow rates and which may be single-stage or double-stage, and in rare instances triple-stage. In the single-stage spool-type valve, the main valve spool is normally actuated directly by an electric torque motor, and fluid is normally ported in a standard four-way configuration. In the two-stage valves, the pilot or first stage receives an electromechanical input, amplifies it and controls the movement of the second or main stage. In a typical two-stage spool-type valve, the low-force torque motor actuates the pilot spool which in turn ports high-pressure fluid to shift the second stage or main spool. Most servo valves are of two-stage design. Also, most servo valves are designed to operate in response to an analog current signal between 0.0 milliamps (mA) and some predetermined maximum current value, such as 10, 40, 100, 200 or 400 mA for example. Normally, the valves are bidirectional and polarity of the input current may be positive or negative. Also, the electric signal may be a simple direct current (DC) signal, or it may be a more sophisticated direct current signal such as relatively high frequency (e.g., 100 to 400 Hz) pulse width modulated (PWM) signal or a basic varying DC signal with a higher frequency alternating current (AC) dithering signal imposed on top of it. The typical factory may have several different kinds of servo valves. So, in order to be useful, any test equipment designed to help trouble-shoot or analyze servo valves should be usable on many different servo valves with different flow ranges and maximum current values.

Recent market research conducted by an affiliate of the assignee of the present invention has shown that approximately 75% of all servo valves sent out for repair require nothing more than simple cleaning and calibration and cleaning. Before the advent of the present invention, such relatively straight-forward repair work could not be successfully performed and tested by the in-house maintenance technicians at the average user's factory. This was because an average factory could not justify spending the money to obtain the expensive, sophisticated hydraulics laboratory equipment, such as a sight flow tube hydraulic test stand, servo amp signal generators or other equipment (like a LVDT-cylinder flow-measuring device) needed to accurately test a rebuilt servo valve for proper operation and calibration. Moreover, these conventional tests are often labor-intensive and time-consuming and require a certain expertise to properly perform them.

When an alleged "malfunctioning" electrohydraulic servo valve is sent out for repair, the charge for examination, tear-down, cleaning and/or calibration can range from about $200.00 (U.S.) and up per valve, even if there is nothing wrong with the valve. Yet, the cost of downtime at a factory or improperly manufactured products is so much higher, that few companies are willing to gamble that nothing is wrong with a suspect valve. So needless repairs and costs are often encountered. Even many companies specializing in servo valve repair lack the equipment for quickly and easily determining whether a valve is functioning according to its manufacturer specifications. Therefore, many such companies routinely tear down any electrohydraulic valve sent in for repair, inspect all components for wear and damage, clean most or all of the components therein using ultrasonic or other suitable cleaning techniques, and then rebuild the valve, and recalibrate it. Thus, it would be very useful to have an affordable, easily used servo valve analyzer which could be used to identify whether anything is indeed wrong with suspect servo valve.

The assignee of the present invention and an affiliated company, namely Servo Craft, Inc. of Rochester Hills, Mich., have worked for several years to develop an electrically controlled servo valve analyzer using conventional electronic flowmeters which is portable and easily and quickly used by repair technicians at a user's factory or a field repair facility to determine whether an electrohydraulic servo valve is in need of repair, what problems, if any, it has, and whether it is properly calibrated. The initial result of this effort was a portable Servo Craft servo valve analyzer, which in a number of respects physically resembled the parts of the servo valve analyzer of the present invention, namely the basic hydraulic circuit, gages and hydraulic power supply shown in FIGS. 1 and 2. It even was constructed in the same kind of portable carrying case. However, this primitive analyzer was very difficult to use and had such limited accuracy that it was often difficult if not impossible to tell whether an observed inaccuracy was the result of a problem with the servo valve or was a result of the fundamental limitations of the analyzer to measure or plot various parameters accurately. Also, it was not a fully automatic test unit. Nevertheless, at least one large automotive company using this analyzer in one of its large plants reported a calculated savings in repair costs of servo valves in excess of $100,000.00 per year.

This primitive servo valve analyzer included two voltmeters with digital read-outs for displaying the input signal current (as measured by the voltage drop across a low-resistance series shunt) and the flow rate through the valve (as measured by a conventional axial-flow turbine flowmeter where the rotating vanes of the turbine were detected by a magnetic pick-up coil). A conventional servo valve amplifier was used to generate the electrical input signal supplied to the servo valve under test. The input to the servo amplifier was supplied by a voltage signal picked off of a manually turned rheostat or a capacitor in a simple RC timing circuit. The current being supplied to the valve and the resulting flow rate through the valve, as measured by the flowmeter, could then be observed on the digital read-outs of the voltmeters. An optional x-y ink-pen plotter, driven in the x and y directions by two external analog signals supplied by the servo valve analyzer, was utilized to produce a "hard-copy" of the results of the test when such a hard-copy was desired. For the plot, the x-axis signal was the current signal being sent to the valve as an input signal, and the y-axis was the resulting flow rate as measured by the flowmeter. However, the plot was unsteady and nonlinear with respect to time. This was because the x-axis signal was either produced by manual rotation of a potentiometer or by the charging or discharging of a capacitor. It was also because the flow rate measured by the conventional electronic flowmeter was inaccurate, especially at low flows. Accordingly, the test results were found to be not repeatable with any real accuracy. For example, we desired to use a plot of the valve when it was properly calibrated as a benchmark against which to compare a plot produced from the testing of the same valve later on to determine whether the valve needed recalibration or was malfunctioning. Due to the inaccuracy and lack of repeatability of the x-y plot, we could not do this.

Most electronically sensed flowmeters used to measure hydraulic flow for tests of servo valves only have an accuracy of about two percent, and are often much more inaccurate in their low hydraulic flow regions. Accuracy of measurement in the very low flow regions is of great importance in evaluating and calibrating the null position of the valve and in observing any nonlinearities in the low-flow regions of valve operation. Many electrohydraulic valves are capable of very accurate operation over two or more orders of magnitude from a very low flow where the valve is barely open to rather high flows where the valve is almost completely open. The foregoing servo valve analyzer was very inaccurate in the low-flow regions due in part to the inaccuracy of its flowmeter. It also was not sufficiently accurate over a wide range to verify proper operation over the wide dynamic range of operation that the valve itself is capable of. However, even the well-equipped servo valve repair facilities that we know of lack an inexpensive and quick way to verify that a cleaned and calibrated servo valve is operating within the manufacturer's original specifications over its full range of dynamic operation.

In light of the foregoing discussion, it is clear that there has been a longstanding need for, and it is the primary object of the present invention to provide, a high-accuracy, easy-to-use, affordable system having manual and fully automatic test modes for analyzing the operation of electrohydraulic servo valves by generating electrical input command signals and monitoring the resulting hydraulic performance of the valve.

Also, in light of the foregoing problems, other more specific objects of the present invention are to provide an electrohydraulic servo valve analyzing system which: (1) can be easily programmed or otherwise adjusted by the user to handle different sizes and types of servo valves; (2) has keyboard means for allowing easy entry of parameters and commands; (3) can accurately and repeatedly generate servo valve command signals with respect to time; (4) employs a high-accuracy electronic turbine flowmeter, and can accurately sense fluid flow over the full dynamic range of the servo valve being tested, including extremely low flows; (5) can accurately and repeatedly generate plots of hydraulic flow rate versus input current data obtained from a valve so as to be able to compare such graphs against one another, and to be able to use such plots as benchmarks; (6) is controlled by a centralized digital control system such as a microprocessor for improved accuracy and reliability; (7) employs a servo valve amplifier and which operates under digital control for improved accuracy with an A/D current feedback loop and repeatability in the DC current signal supplied to the servo valve; (8) is capable of substantially continuous high-speed, acquisition of current and hydraulic flow data resulting from the testing of a servo valve, and has the ability to store or plot same; and (9) can produce x-y plots of input current-output flow rates using an appropriate one of several selectable scales for such x-y plots to suit different servo valves.

SUMMARY OF THE INVENTION

In light of the foregoing objects, there is provided according to one aspect of the present invention, a system for testing the operation of an electrohydraulic servo valve, operable in a fully automatic test mode, by applying an electrical input command signal to the servo valve and monitoring the hydraulic performance of the servo valve in response thereto. The system comprises: means for making hydraulic connections to the servo valve to be tested; turbine flowmeter means for accurately sensing hydraulic fluid flow rate over substantially the full dynamic range of the servo valve being tested; and means for accepting operating input commands which specify at least one test parameter and initiate the automatic test mode. The system also includes servo amplifier means for producing the electrical input command signal; connection means for supplying the command signal to the servo valve; and digital electronic control means for controlling the overall operation of the system in the automatic test mode, which attempts to cycle the servo valve at least once through substantially its full nominal range of operation by automatically varying the input command signal over at least a significant range of possible input command signal values for the servo valve being tested. The digital electronic control means preferably includes at least one microprocessor supervising the overall operation of the system in the automatic test mode, and one memory means for storing a computer program specifying a sequence of steps to be carried out in a predetermined order in the automatic test mode.

In a preferred embodiment of this first aspect of the present invention, a highly accurate turbine flowmeter means is utilized in order to measure properly the hydraulic fluid flow, particularly at very low fluid flow rates. This flowmeter means preferably includes: a flowmeter body having a passage therethrough and a turbine having at least three blades disposed at least partially within the passage for rotation as fluid whose flow rate is to be measured impinges the vanes; vane detector means for generating an electromagnetic flow signal whose period corresponds inversely to the rate of rotation in response to presence and absence of the vanes in a predetermined location within the body; and dedicated signal processing means for measuring the period of the electromagnetic flow signal by selectively counting pulses of a high-speed time base accumulated during such period. The turbine is preferably an axial-flow turbine rather than a paddle-wheel style turbine. The flowmeter means preferably includes digital processing means for compensating for a predetermined nonlinearity if any between the rate of rotation in the turbine and the rate of fluid flow through the body, at least in a low-flow region of operation of the flowmeter means. This digital processing means is preferably part of the digital electronic control means.

According to a second aspect of the present invention, there is provided a system for testing an electrohydraulic servo valve by generating an electrical command signal for the servo valve and monitoring the resulting hydraulic performance of the servo valve. This system comprises: means for generating the electrical command signal in a manner that varies with respect to time and which can be accurately repeated in subsequent tests; and means for applying the command signal to the servo valve. The system also comprises: means for sensing at least one characteristic of the hydraulic performance of the servo valve in response to the applied command signal; digital electronic control means for controlling the overall operation of the system during the test of the valve involving operating the valve through at least one dynamic operating region of the valve; and plot means for graphing, on permanent record means, data indicating the relationship between various values of the input command signal during the test and the one sensed characteristic of hydraulic performance of the servo valve in response thereto. In this system, the means for generating and the means for sensing are operated in a sufficiently accurately manner so that the graphed data will normally be highly uniform between successive tests of the same valve performed within a short interval of time and under substantially identical conditions. The system preferably includes input means, such as a keyboard or keypad, for receiving commands and desired command values from an operator of the system, with one such command being a selection of desired parametric data for configuring the system to produce an x-y plot of a selected one of several sets of scaling factors. In this system the plot means preferably is a digitally controlled plotter for generating a graph having an x-axis and a y-axis, and the permanent record means preferably is a flat durable sheet such as paper, mylar, bristol board or the like.

According to a third aspect of the present invention, there is provided a method for testing an electrohydraulic servo valve. The method comprises steps of: (a) providing a microprocessor-based servo valve analyzing system connectable to a hydraulic power supply and to the servo valve; (b) specifying via operator input means a maximum current value and a maximum hydraulic flow rate associated with the servo valve; (c) showing at least one of the specified maximum values on a first digital display distinct from the operator input means; (d) placing the servo valve analyzing system in an automatic test mode during which the servo valve is subjected to a predetermined test including providing to the servo valve a highly accurate input command signal which varies in a predetermined manner with respect to time; and (e) on a plotter connected to and driven by the servo valve-analyzing system, graphing the hydraulic flow rate resulting from the input command signal applied to the servo valve. The method may also include the further step of: (f) specifying via operator input means one of several predetermined scales for their graphing to be performed during step (e). The plotter used in step (e) is preferably an x-y plotter and for graphing data produced during the automatic test mode onto a flat sheet such as paper or mylar. The magnitude of the input command signal is preferably varied in a predetermined generally linear manner with respect to time, except when switching from a steadily increasing value to a steadily decreasing value and vice versa.

According to a fourth aspect of the invention, there is provided a high-accuracy, easy-to-use, portable system which is operable in a fully automatic mode for testing the operation of an electrohydraulic servo valve by generating a varying electrical input command signal and monitoring and recording hydraulic performance of the servo valve in response to the varying command signal. This system comprises: manifold means for making temporary hydraulic connections to the servo valve; electrical connector means for making electrical connection to at least one electrical input lead of the servo valve; turbine flowmeter means for accurately sensing fluid flow over the full dynamic range of the servo valve, including very low flows; keypad means for accepting operator input commands which specify at least one test parameter. The system also includes servo amplifier means for producing an amplified analog current signal to be input into the servo valve; analog-to-digital means for providing a digital feedback signal whose value corresponds to the magnitude and plurality of the amplified current signal being supplied to the servo valve; plotter interface means for transmitting data and control signals to x-y plot means so that the current and flow measurements may be recorded on permanent visual presentation means; and centralized digital electronic controller means for automatically controlling the overall operation of the system in an automatic test mode which attempts to cycle the servo valve at least once through its full nominal range of hydraulic flows, the centralized means including at least one microprocessor and memory means for storing a controlled program and selected parametric data for configuring the system to produce current and flow measurements on an x-y plot having predetermined scales for input current and hydraulic flow rate. The turbine flowmeter means is preferably of the type described with respect to the second aspect of the present invention.

These and other aspects, features, objects and advantages of the present invention may be better understood by reading the detailed description presented below in conjunction with the attached drawings and appended claims.

BRIEF DESCRIPTION OF THE DRAWINGS

The drawings form an integral part of the description of the preferred embodiments and are to be read in conjunction therewith. Like reference numerals designate like components in the different figures.

FIG. 3 is a simplified fragmentary side cross-sectional view of the FIG. 2 control panel taken along line 3—3 of FIG. 2 showing a typical hydraulic manifold and adapter plate of the present invention.

FIGS. 4 through 6 are electrical schematic diagrams corresponding to the various blocks in the left and center portions of FIG. 1, wherein:

FIG. 4 conceptually shows an optical sensor for detecting turbine rotation, and also shows a preferred interface circuit therefor;

FIG. 5 shows a preferred servo driver/amplifier circuit for use as an input current signal to the servo valve to be tested; and FIG. 6 shows a detailed block diagram of the visual display for the FIG. 1 keyboard/display unit.

FIG. 7 is a table showing one possible arrangement for the ranges of RPM values and linear approximation values used for each range to correct for nonlinear flow versus revolutions per second (RPS) characteristics of the turbine flowmeter in its low-flow regions of its operation.

FIG. 8 is a front view of a preferred turbine flowmeter used in the present invention, which has a turbine that rotates transversely to the fluid flow.

FIG. 9 is a cross-sectional view of the FIG. 8 turbine flowmeter taken along line 9—9 of FIG. 8.

FIG. 10 is a fragmentary cross-sectional view taken along line 10—10 of FIG. 9 showing the turbine of the flowmeter.

FIG. 11 is a fragmentary cross-sectional view taken along lines 11—11 of FIG. 9 showing the separator and retaining ring of the flowmeter.

FIG. 12 is a fragmentary perspective view showing a preferred optical sensor arrangement for detecting turbine rotation that uses a fiber optic cable with an optical sensor housing at a first end thereof and an artificial light source and photodetector at the other end thereof remote from the first end.

FIG. 13 is an enlarged fragmentary cross-sectional view of the window end of the FIG. 12 optical sensor housing mounted in the flowmeter body and sensing one of the turbine vanes.

FIG. 14 is an illustrative graph produced by the x-y plotter when the FIG. 1 system operates in its automatic mode and tests a typical servo valve.

FIG. 15 is a table illustrating the various preprogrammed ranges of currents and flows which may be selected by an operator of the FIG. 1 system.

FIGS. 16–21 are software flowcharts which illustrate the sequence of operations of the FIG. 1 system, wherein:

FIG. 16 illustrates distinct phases or modes of operation of the FIG. 1 system;

FIG. 17 illustrates the "initialize system" phase of operation shown in FIG. 16;

FIG. 18 is a detailed flowchart showing the manual mode of operation of the FIG. 1 system;

FIG. 19 shows the sequence of steps required to initiate the automatic mode of operation of the FIG. 1 system;

FIG. 20 is a detailed flowchart showing steps carried out during the automatic mode of operation of the FIG. 1 system; and FIG. 21 is a detailed flowchart illustrating the functions of the servo valve driver routine which operates the servo valve driver circuit.

DETAILED DESCRIPTION OF THE PREFERRED EMBODIMENTS

Figure 1:
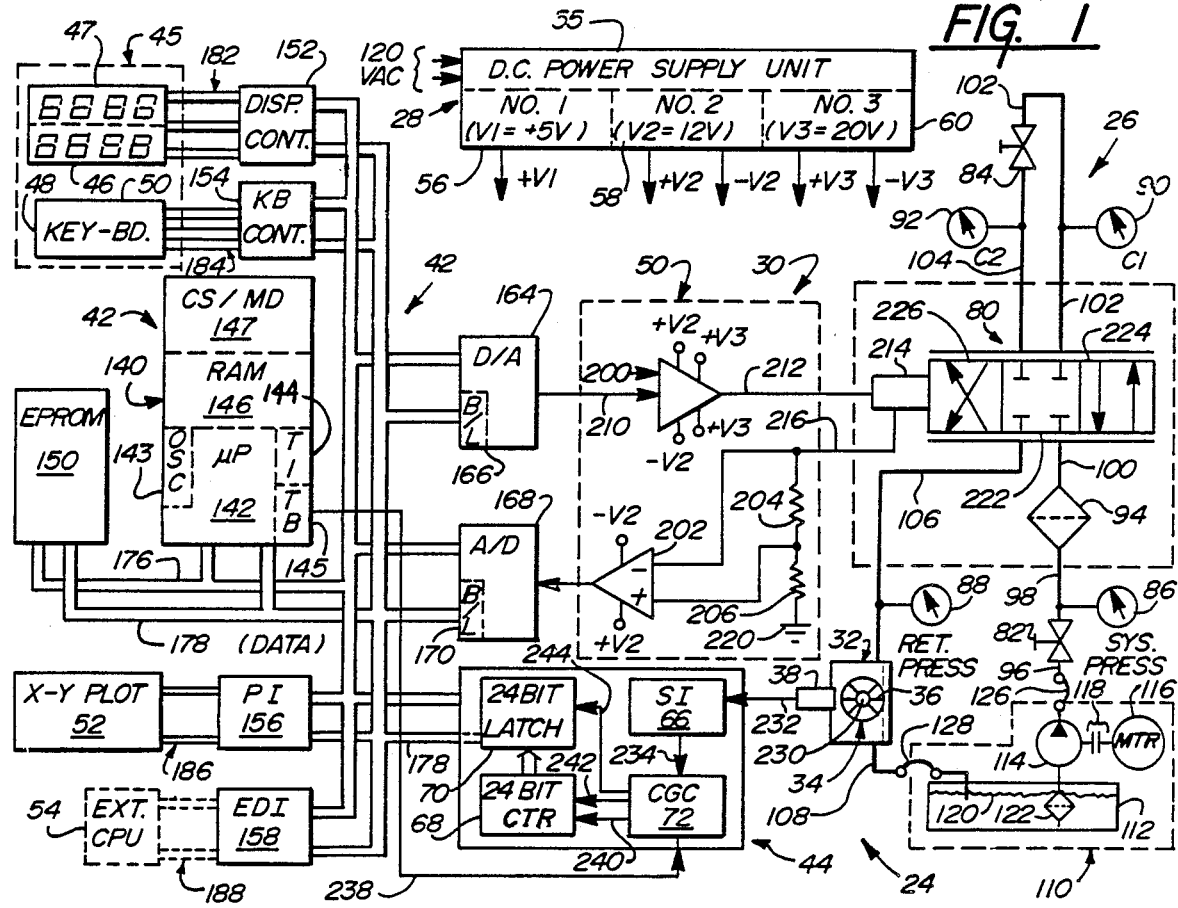
FIG. 1 is a composite block diagram of the servo valve analyzing system of the present invention with the right side of FIG. 1 being a schematic diagram of the hydraulic components and piping of the system including a turbine flowmeter and a typical servo valve to be tested, and with the left side and center of FIG. 1 showing a block diagram of the electrically-operated components of the system including a microprocessor-based electronic controller, a visual display and keypad unit, and an x-y plotter.

Referring now to FIG. 1, there is shown a composite block diagram of the servo valve analyzing (SVA) system 24 of the present invention which includes a hydraulic circuit section 26, power supply unit 28 and an electronic control system 30 shown in block diagram form in the left-hand and center portions of FIG. 1. The hydraulic system 26 includes a turbine flowmeter 32 having a turbine 34 with multiple vanes 36 and a vane sensor 38 for detecting the rotating vanes of the turbine.

The controller 30 includes: a microcomputer system 42; dedicated signal processing circuitry 44; a keyboard/display unit 45 including two multiple-digit displays 46 and 47 and an operator input means such as keyboard 48; and a servo driver circuit 50. An x-y plotter 52 is required to utilize the system 24 to produce graphical hard-copy output of the test results produced during auto test mode operation of the system 24. The system 24, however, can be used without the plotter to carry out preliminary tests on an electrohydraulic servo valve to be tested via the system's "manual mode" of operation. The power supply section 28 may include a common AC-to-DC subsection 55 and first, second and third DC power supplies 56, 58 and 60.

The signal processing circuitry 44 includes a sensor interface circuit 66 connected to the sensor 38, a high-speed, high-capacity digital counter 68, an equally high-capacity digital latch 70, and a counter and gating control (CGC) circuit 72. The functions of the counter, latch and CGC circuit will be explained shortly.

The hydraulic section 26 of system 24 includes a conventional electrohydraulic servo valve 80 to be tested, shut-off valve 82, loading valve 84, and four 0-to-3000 psi hydraulic pressure gages 86, 88, 90 and 92, all connected by suitable hydraulic fluid conduits or passages 96-108 as shown. A conventional hydraulic power supply 110 which is not part of the system 24, but is needed to utilize the system 24, includes a 60-gallon hydraulic reservoir 112 and a 20 gpm variable volume hydraulic pump 114 with an adjustable pressure compensator powered by 25 horsepower electric motor 116 through flexible coupling 118. The pump 114 obtains hydraulic fluid 120 in the reservoir 112 through section inlet strainer 122. Conventional flexible hydraulic hoses 126 and 128 respectively serve as the inlet and outlet of the hydraulic circuit section 26. All of the hydraulic components except for the flowmeter 32, are conventional in design and construction. The design and layout of hydraulic circuit 26 are the same as used in the primitive portable servo valve analyzer described in the background portion of the specification. To avoid overheating any part of the electronic controller 30, conventional cooling techniques, such as an air-to-oil heat exchanger (not shown), may be used to keep the oil 120 in reservoir 112 from exceeding a predetermined maximum safe temperature, such as 140 degrees Fahrenheit, in a manner well-known in the art.

The microcomputer system 42 is based around microcomputer 140 which includes: a microprocessor 142 with a 6 MHz crystal oscillator 143, a hardware timer interrupt circuit 144 and a 3 MHz time base output 145; random access memory (RAM) 146; and a chip select/memory decode (CS/MD) circuit 147. The microcomputer system 42 also includes an ultraviolet erasable, programmable read-only memory (EPROM) 150; a display controller 152; a keyboard controller 154; a plotter interface 156; an optional external device interface 158; a digital-to-analog (D/A) converter 164 with a buffer/latch 166; and an analog-to-digital converter 168 with a buffer/latch 170.

Microprocessor 142 communicates with the remainder of the circuits and modules through a conventional multiple-line control and address bus 176 and eight-line databus 178, which are connected to blocks 150-170 as shown. Suitable sets of conductors 182, 184 and 186 connect the controllers 152, 154 and plotter interface 156 to the displays 46 and 47 plotter 52 as shown. Similarly, conductors 188 shown in dotted lines connect the external device interface 158 to the external device 54 which may be another computer (CPU).

Any suitable conventional microprocessor system may be used for system 140. In a preferred embodiment of the present invention, an Intel or Oki 8085 microprocessor was used. Further details of how such microprocessor systems may be configured are provided in our aforementioned application Ser. No. 193,242, and therefore will not be repeated here.

The power supply 28 may have any suitable number of separate supplies, depending on the particular requirements of the electronic controller 42. In the embodiment shown in FIG. 1, power supply 56 provides +5 volt DC power to all of the digital circuits within the controller 42 and to the displays 46 and 47. The second and third power supplies 58 and 60 are utilized to supply regulated DC power at plus and minus 12 volts and plus and minus 20 volts respectively to the servo driver circuit 50 as shown. Any conventional or suitable power supply design or construction may be used.

The servo amplifier circuit 50 includes a feed-forward power amplifier circuit 200, a feedback amplifier circuit 202, and shunt and load resistors 204 and 206. The amplifier 200 receives a voltage input signal on conductor 210 from D/A converter 164 and provides generally proportional amplified output current signal on conductor 212 to the electrically actuated pilot operator 214 of the servo valve 80 to be tested. The pilot operator 214 may include a torque motor winding or solenoid coil winding through which the current actually passes. The precise amount of current being delivered to the pilot operator 214 is monitored via the feedback circuit 202 which monitors the voltage drop across shunt resistor 204 in a manner well known to those skilled in the art. In particular, current flows from conductor 212 through the operator 214 and conductor 216 through resistor 204 and 206 to the ground 220. The servo driver circuit 50 in conjunction with D/A converter 164, A/D converter 168 and microcomputer system 42 form a closed-loop feedback system utilized to maintain a desired amount of current flowing through the electrically-operated actuator 214 in a manner that will be explained in detail later.

The servo valve 80 shown in FIG. 1 is conventional one, two or three-stage, infinitely positionable having a center or null position which effectively blocks all ports as shown by the center envelope 222. As the valve spool within valve 80 is shifted toward the left by operator 214, the connections represented in the right envelope 224 begin to open, and pressurized hydraulic fluid available from conduit 100 will flow via conduits 102-106 through the flowmeter 32 and conduit 108, provided that valves 82 and 84 are open. Similarly, when the operator shifts the spool of servo valve 80 to the right so that the connections represented by left-most envelope 226 begin to open, hydraulic fluid from conduit 100 will flow through conduits 102-108, and the amount of fluid flowing will be detected by flowmeter 32. Due to the way conduits 102 and 104 are piped together, the flow through conduit 106 and turbine flowmeter 32 is always in the same direction, that is, from conduit 106 to conduit 108. Accordingly, fluid flow will always be measured as a positive value.

The fluid flowing through the flowmeter 32 will normally be a hydraulic oil, but could be other types of liquid such as water-soluble oil. The flowmeter 32 of the present invention will provide extremely accurate flow measurements whenever a substantially incompressible liquid is used, even though the pressure varies significantly. The flowmeter 32 shown in FIG. 1 is the paddle-wheel type which has fluid flow transverse to the axis 230 of the turbine 34. In preferred embodiments of the present invention designed for liquids such as SSU 150 hydraulic oil, an axial flow turbine flowmeter is utilized, as will later be described in connection with FIGS. 8-11. The paddle-wheel turbine flowmeter 32 shown in FIG. 1 to illustrate the generality of the mechanical portions of the flowmeters which can be used with the servo valve analyzing system 24 of the present invention. A preferred sensor 38 described in detail in connection with FIGS. 8-13 senses the vanes optically and is preferred over magnetic sensors due to its greater temperature resistance. However, a conventional magnetic proximity sensor, such as the self-contained proximity switch Model No. ET111 from Namco Controls Co. of Mentor, Ohio may also be used for sensor 38. This proximity switch is normally open and closes upon detecting the presence of ferromagnetic material within a predetermined location in front of the switch housing. When a magnetic proximity switch is used for sensor 38, the vanes 36 of turbine 34 should be made of ferromagnetic material to ensure that their presence in the predetermined location causes the proximity sensor to produce an output.

The signal output on signal path 232 from proximity sensor 38 is an electromagnetic signal whose period is inversely proportional to the rate of rotation of the turbine 34, as determined by the detected movement of the vanes 36 past the predetermined location. The sensor interface circuit 66 conditions this raw electromagnetic input signal and presents it to the CGC circuit 72 via conductors 234. A 3 MHz signal, which is a pulse rate of at least ten times that of the maximum expected pulse rate of the input signal on line 234, is provided to the CGC circuit 72 via line 238 from time base output 145 of microprocessor 142. The circuit 72 uses the relatively slow-speed input signal on line 234 from circuit 66 to gate the time base signal for delivery on line 240 to the digital counter 68. The CGC circuit also provides a reset signal to the counter via line 242. The high-frequency clock pulses appear on line 240 for an interval of time between two successive pulses produced by the detection of the successive vanes 36 by switch 38. After one such cycle is complete, the CGC circuit 72 stops the delivery of pulses to the counter 68 via line 240, and a signal on the control line 244 from the CGC circuit commands the latch 70 to read the current count number (CCN) presently found in the counter 68. The CCN is thus a first numerical value proportional to the period of the electromagnetic input signal from the sensing means 38.

Thereafter, the CGC circuit produces a reset pulse which resets the counter 68 and is sent via bus 176 to interrupt the microcomputer system 42. Then the system 42 sends appropriate read signals via address and control bus 176 to the latch 70, causing the latch 70 to place its contents on the data bus 178 so that the system 42 can read the first numerical value (CCN). Detailed circuit diagrams and a timing diagram for a preferred embodiment of the dedicated signal processing circuit 44 are provided in our copending application Ser. No. 193,242, which should be consulted if further details about the construction or operation of circuit 44 are desired.

Next, the microcomputer system 42 produces from the first numerical value just read a second numerical value adjusted to compensate for any predetermined nonlinearity between the rate of rotation of the turbine 34 and the rate of fluid flow through the turbine flowmeter 32. As is more fully explained in our copending application Ser. No. 193,242, compensation for nonlinearities is normally not required for higher flow rates, particularly where an axial flowmeter is utilized to measure a flowing liquid. However, it is virtually always necessary to adjust the numerical value in order to compensate for nonlinearities experimentally determined to exist in the low-flow regions of operations of the flowmeter 32.

The microcomputer system 42 computes an average of several successive readings, such as three readings, of the second numerical value and passes this computed average flow rate $F_A$ along to the display controller 152 for presentation on the visual display 46. To compute the average value, the successive readings are stored in a FIFO stack within the random access memory (RAM) of system 42. To compute the average, the last "M" second numerical values are summed together and then divided by "M" to compute the average value to be displayed. The value of "M" may be fixed at any suitable integer value, such as three, or may vary as a function of the rate of turbine rotation. For example, for higher rates of rotation, the last ten or twenty entries within the stack may be added, whereas for very low flow rates, the last two to five values from the stack may be averaged. The benefit of using a larger value of "M" when the flow rate is higher is that a somewhat more accurate flow rate may be displayed. The benefit of using a smaller value of "M" when the flow rate is extremely slow is that the readings presented on the visual display 46 correspond more closely to the actual variations in flow rate. However, more fluctuations will be seen as the value of "M" is reduced.

The microcomputer system 42, before sending the data out to the display controller 152, first scales the value $F_A$ so that the value presented on the display is in terms of the desired units, whether that be gallons per minute, cubic inches per second, cubic centimeters per second, liters per minute, or the like. This scaling factor is preferably stored within the EPROM 150 so that it is not lost when the controller 150 is powered down. Similarly, the correction factors for adjusting nonlinearities, as well as the general computer program utilized to operate the system 142 in accordance with the sequences described herein, are preferably stored in EPROM 150.

The microcomputer system 42 may, if desired, provide the same information being presented on the displays 46 and 47 to the external device interface 158 via the buses 176 and 178. The external device interface may also be used for unidirectional or bidirectional communications with an external device 54, which may be another computer's central processing unit (CPU) or a control system. As those in the art will appreciate, the microcomputer system 42 may also receive commands from the external device 54 and respond to them as requested. For example, the external device 54 may periodically ask microcomputer system 42 to provide the latest actual current value or actual flow rate presently held in RAM or otherwise monitor the operation of the overall microcomputer system 42. This type of interaction between two digital processing systems is well understood in the art, and details of its implementation need not be further discussed here.

Figure 2:
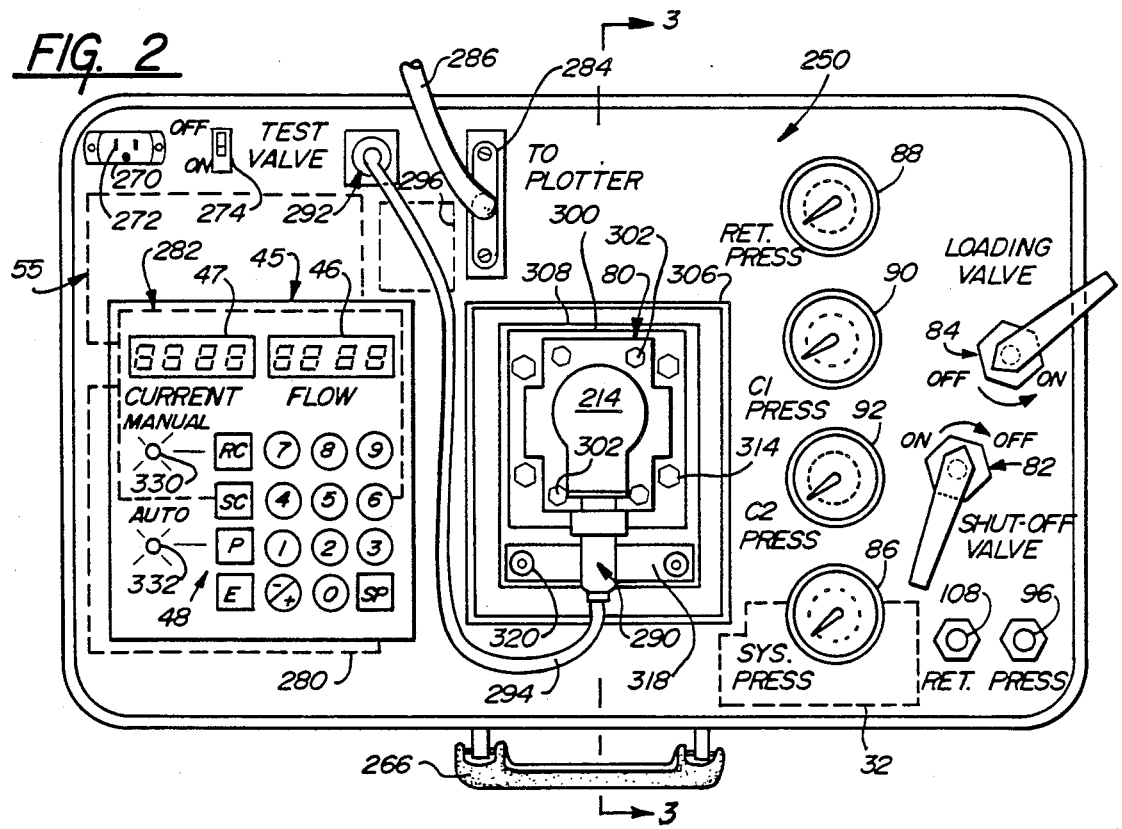
FIG. 2 is a plan view of a preferred layout for the operator control panel of a portable version of the FIG. 1 system showing the typical servo valve to be tested, the keypad/display unit, four hydraulic gages and two shut-off valves.

FIG. 2 is a plan view showing a preferred mechanical layout for the operator control panel 250 of a portable version of the FIG. 1 system 24 showing the typical servo valve 80 to be tested mounted in the center of the panel. As may best be seen in FIG. 3, the panel 250 includes a flat plate of aluminum 252 positioned within a bottom half 254 of a conventional rigid suitcase 256 having a top half 258 shown in phantom which can pivot about hinge assembly 262, thus permitting the top 258 to be opened in the direction indicated by arrow 254. A conventional handle 266 may also be provided. The overall dimensions of suitcase 256 in the preferred embodiment are 21 inches by 17 inches by 7.5 inches, with a total weight of about 40 pounds. The suitcase 252 is of conventional design and may be made out of lightweight aluminum or out of a suitable tough plastic material such as ABS. When the suitcase 256 is closed up, the entire SVA system 24, with the exception of the x-y plotter 52, may be readily hand-carried about by handle 266. The x-y plotter 52 may be mounted in a similar suitcase, and both the system 24 and plotter 52 may be conveniently carried at the same time by one person.

The operator panel 250 also includes a conventional recessed receptacle 270 with male plug prongs 272 for receiving 120 volt AC power from a power cord (not shown). The AC power so received may run through a conventional on-off switch 274 before going to the DC power supply unit 55 located nearby under plate 252 in the location indicated by dotted lines in FIG. 2. The microcomputer system 42 is preferably located principally on a single printed circuit board 280, the general location of which is shown in dotted lines in FIG. 2. The display controller 152 and keyboard controller 154, may be located on a separate printed circuit board 282, whose general location directly beneath keyboard display unit 45 is shown by dotted lines 282.

The x-y plotter 52 is connected to the plotter interface 156 on PC board 280 via a conventional ribbon connector assembly 284 and cable 286 containing conductors 186 shown in FIG. 1. The pilot operator 214 is similarly connected to wires 212 and 216 from the servo driver circuit 50 via conventional connector assemblies 290 and 292 and cable 294. The servo driver circuit 50 may be located on a separate printed circuit board indicated by dotted lines 296 in FIG. 2 if desired or may be located on the main PC board 280.

FIGS. 2 and 3 show that the servo valve 80 to be tested is mounted on an adapter plate 300 by a suitable number of bolts 302. The adapter plate in turn is mounted on a hydraulic interconnection manifold 304 which includes tub-like basin 306 to collect any dripping hydraulic oil and manifold block 308 to which conventional hydraulic couplings 310 and 312 for hydraulic lines 100 and 102 are made. Conventional bolts 314 are used to fasten the adapter plate 300 to the manifold block 308. If desired, the filter 94 may be located as shown in FIG. 3 within the manifold block 308 and is accessible through cover plate 318 held in place by bolts 320.

As shown in FIGS. 2 and 3 by dotted lines, the flowmeter 32 may be located under plate 252 in the vicinity of system pressure gauge 86. The hydraulic conduits 96-108 shown in FIG. 1 are also all located beneath the aluminum plate 252 and include conventional hydraulic tubing and fittings plumbed up as necessary to interconnect the valves 82 and 84 and the gauges 86-92 as shown in FIG. 1. To avoid unnecessary clutter of FIGS. 2 and 3, the conventional fittings and lines are not shown therein. FIG. 2 also shows that the keyboard/display unit 45 may include, if desired, pilot lights 330 and 332 which may be respectively illuminated to indicate manual and automatic modes of operation of the servo valve analyzing system 24. The keyboard 48 preferably includes sixteen keys arranged in a four-by-four pattern shown in FIG. 2. The keyboard 48 includes numeric keys "0" through "9," a "+/−" key, and five function keys which are shown with a rectangular outline. In FIG. 2, these function keys are labeled: "RC" for Ramp Current; "SC" for Set Current; "P" for Plot; "E" for Enter; and "SP" for Select Program. The keyboard/display unit 45 preferably includes the legends shown thereon. Similarly, the plate 252 preferably includes the other legends such as "TEST VALVE," "SYS. PRESS" and the like shown in FIG. 2.

FIG. 4 shows conceptually the optical sensing arrangement within flowmeter 32 for detecting the rotation of a turbine 34 on shaft 230 and shows a preferred interface circuit 340 therefor. The circuit 340 includes an artificial light source section 342 including an artificial light source 344 which may be a light-emitting diode 344 as shown. Resistor 346 serves to limit the current through the light source 344 to a safe value. Photodetector section 352 of circuit 340 includes a photodetector 354, which may be a conventional phototransistor and a DC isolation capacitor 356 having some internal leakage represented by resistor 358. The optical sensing means shown in FIG. 4 includes conduit means 360 including optical conduits 362 and 364 which respectively serve to direct or channel light from the source 344, represented by arrow 366 to a predetermined location 365 through which the tips of the vanes 36 pass, causing light, as represented by arrow 368, to be reflected off of any tip present at location 365 through conduit 364 to phototransistor 354. The reflected light 356 hits the base region of phototransistor 354, causing it to become conducting and accordingly charge up capacitor 356 faster than it can be bled off by resistor 358. As a result, the voltage on conductor 372 rises and falls, by at least several tens of millivolts periodically in unison with the presence or absence of the tips of the vanes 36 at the predetermined location 365.

Circuit 340 also contains an amplifier section 374 including two identical operational amplifiers 376 and 378, each configured by the resistor network shown to have a gain of 10, so that the overall amplifier section 374 has a gain of 100. The small voltage signal on conductor 372 is inverted and amplified by op-amp 376, and its output on conductor 380 is similarly inverted and amplified by second op-amp 378, resulting in a turbine-vane present (TVP) signal on conductor 382.

The circuit 340 may be used as the sensor interface circuit 66 shown in FIG. 1 with the output signal TVP being delivered on conductor 234 to CGC circuit 72. In a preferred embodiment of the circuit 340, a 1.0 microfarad capacitor with a very small amount of internal leakage is used as the capacitor 356. The size of the capacitor and the values of the various resistors in the amplifier section 374 were all experimentally determined in order to be able to produce a 0-volt to 5-volt signal as an output on line 382 at the maximum expected vane frequency $f_V$, corresponding to the maximum rate of rotation for the turbine 36 at maximum expected fluid flow rates. Other sensor interface circuits may also be readily utilized to produce substantially the same results as circuit 340 shown in FIG. 4, as is discussed in our copending application Ser. No. 192,242.

FIG. 5 shows one possible implementation of servo driver circuit 50. Like its counterpart in FIG. 1, the FIG. 5 circuit is made up principally of a feed-forward power amplifier 200, a feedback amplifier 202 and resistors 204 and 206. The voltage output by D/A converter 164 is fed via conductor 210 into the first stage of amplifier 200, which includes a voltage divider network formed by resistors $R_A$ and $R_B$. The voltage across resistor $R_B$ is provided by conductor 400 to the input of the first stage's operational amplifier 402. The gain of amplifier 402 is determined by the value of resistances $R_A$, $R_B$ and $R_C$ in a manner well known to those skilled in the art. The output 404 of op-amp 402 is then fed to the second stage of amplifier 202, into the middle of the second stage's voltage divider network consisting of resistors 406, 408, 410 and 412 which are tied between the plus and minus 12-volt power supply terminals as shown. Accordingly, the voltage on output 404 will influence the respective voltages on conductors 414 and 416 respectively leading to the bases of the second stage transistors, namely npn transistor 418 and pnp transistor 420. The emitter of transistor 418 is connected to one side of resistor 422 while the collector of transistor 420 is connected to one side of resistor 424. The other sides of resistors 422 and 424 are connected to a common current-limiting resistor 426 which has its other side tied to ground 220.

The third and final stage 430 of feed-forward amplifier 200 is a well-known push-pull power transistor amplifier arrangement including pnp transistor 432 and npn power transistor 434 which are tied together and have a common output at conductor 212. Current-limiting resistors 436 and 438 are respectively tied to the emitters of transistors 432 and 434. Diodes 442 and 444 protect the collector-emitter paths of transistors 432 and 434 against voltage surges which can occur upon interrupting power to the coil within pilot operator 214. Diodes 446 and 448 similarly protect the base-emitter junctions of transistors 432 and 434 from over-voltages. Resistors 450 and 452 respectively supply current to the bases of transistors 432 and 434 in order to allow the transistors to operate properly.

Small capacitors 456, 458 serve to filter out high-frequency noise from the first stage of feed-forward amplifier 200. Resistor 460 serves to allow output 404 of op-amp 202 to float so that it is free to assume proper voltage in response to input command voltages received on conductor 210.

The feedback loop 470 of servo valve driver circuit 50 includes shunt resistor 204 and feedback amplifier circuit 202. Diodes 472 ensure that voltage surges induced by turning off coil 214 do not generate excessive voltages across conductors 474 and 476 which are respectively fed into the minus and plus inputs of operational amplifier 478 through resistors 480 and 482 which have an identical value. Resistor 206 serves as a current-limiting resistor and may be selected to have any suitable value, such as 2 ohms as shown. The gain of feedback amplifier 202 is determined by the values of resistor 486 and potentiometer 488, whose proper setting can be determined easily by routine experimentation of the type well understood by those in the art. The output 490 of op-amp 478 is connected to a low-pass RC filter comprised of resistor 492 and capacitors 494 and 496 which are arranged in series and tied to ground 220.

The output 498 of the low-pass filter is connected to A/D converter 168 shown in FIG. 1.

The operation of specific components shown in FIG. 5 within feed-forward amplifier 200 and feedback amplifier 202 are well-known to those in the art. In operation, the servo driver circuit 50 receives an input voltage signal 210, whose magnitude and sign corresponds to a desired magnitude and sign of output current to be produced by the third stage 430 of feed-forward amplifier 200 and delivered via conductor 212 to the pilot operator 214. Due to inherent nonlinearities in the operation of the overall feed-forward amplifier 200 and/or electrical characteristics of the pilot operator, the output current $I_O$ in conductor 212 will not necessarily correspond to the desired current level indicated by the voltage signal from D/A converter 164 on conductor 210. Accordingly, in a manner well known to those in the art, the actual current $I_O$ flowing through conductors 212 and 216 is monitored by sensing the voltage across shunt 204, appropriately scaling this voltage via feedback amplifier 202 and delivering the filtered and scaled voltage signal on conductor 498 to analog-digital converter 168. Thereafter, in a manner which will be further described, especially with respect to FIG. 21, the microcomputer system 412 evaluates the difference between the desired current and the actual current and incrementally adjusts the command signal provided via D/A converter 164 to conductor 210 until the actual current $I_O$ has reached the desired value.

FIG. 6 shows a detailed diagram of a circuit 500 for the visual displays 46 and 47 connected to display controller 152. Circuit 500 includes: a power transistor decoder driver 502; two 3-to-8 decoder/drivers 504 and 506; four power transistors 508; three banks of current-limiting resistors 510, 512 and 514 connected to multiline conductor sets or buses 516, 518 and 520; and two sets 46 and 47 of seven-segment with decimal point LED numeric-display cells 522; with all of the foregoing components connected as shown. The circuit 500 operates in a manner well known to those in the art. Briefly, the display controller 152 loads appropriate command signals onto three-line buses 532 and 534, which are decoded by blocks 504 and 506 and output to eight-line buses 518 and 520 so that desired segments and/or decimal point of the second least significant digit of displays 46 and 47 will turn on. Shortly thereafter, controller 152 sends an appropriate coded signal on a two-line bus 530 to decoder/driver 502 to turn on one of the power transistors 508, such as transistor 508-1 associated with the least significant digit (LSD) of displays 46 and 47. In a well known manner, this pattern is repeated for the remaining three digits of displays 46 and 47. The most significant digits (MSD) of displays 46 and 47 do not include decimal points. Instead, the conductors of eight-line buses 518 and 520 associated with the decimal points of the displays is used to operate the two pilot lights 330 and 332 which respectively signify when the SVA system 24 is in manual mode and automatic mode of operation. While circuit 500 is well-suited to operate digital displays 46 and 47, it is recognized that any other suitable displays and driver circuits could be utilized, such as liquid crystal displays and their typical driven circuits, to form the display portion of keyboard/display unit 45.

Typical component values are set forth in FIGS. 4 through 6. Other typical components used in controller 30 may be as set forth in Table I below.

TABLE I
ELECTRONIC COMPONENTS

| Ref. No. | Item | Manufacturer | Model No. Part No. |
|---|---|---|---|
| 48 | membrane keyboard | Sheldahl | SC-16 |
| 52 | x-y plotter | Allen Datagraph, Inc. (in Salem, N.H) | 707 |
| 68 | 12-bit counter (2) | Motorola | 4040 |
| 70 | 8-bit latch (3) | Motorola | 74LS374 |
| 142 | microprocessor | Intel or Oki | 8085 Series |
| 146 | RAM & I/O ports | Intel or Oki | 8155 Series |
| 147 | Chip Sel. Decoder/Driver | Motorola | 74LS138 |
| 150 | EPROM (8K × 8) | Seeq | DQ2764.4 |
| 152 | display controller | NEC | 8279 |
| 156 | plotter interface | Motorola | 74LS138 |
| 164 | D/A converter | Analog Devices, Inc. | AD625 |
| 168 | A/D converter | Analog Devices, Inc. | AD573 |
| 402, 408 | operational amp. | Analog Devices, Inc. | AD-OP07 |
| 418 | npn BJT | -any- | 2N4401 |
| 420 | pnp BJT | -any- | 2N4403 |
| 432 | power pnp BJT | Motorola | MJE2955T |
| 434 | power npn BJT | Motorola | MJE3055T |
| 504, 506 | display decoder | Motorola | 74LS145 |
| 508 | display transistor | -any- | 2N2907 |
| 522 | 7-segment LED digit | Fairchild | FND507 |

Those skilled in the art of electronics may select functionally similar components with additional capacity or accuracy if desired without departing from the spirit of the present invention. For example, D/A and A/D converters comparable to those specified above for converters 164 and 168, but having an accuracy of 12 bits (4096 places) rather than 10 bits (1024 places), may be selected. While such higher accuracy devices cost more, they also permit the controller 30 to control and measure the current being produced by servo driver circuit 50 more accurately, which we prefer to do for servo valves whose maximum input current is 50 mA or less. Those skilled in the art may also use different digital and analog circuits for performing the functions of the circuits disclosed herein without departing from the scope of the present invention.

FIG. 7 is a table which illustrates how the nonlinearities in the low-flow region of an axial-flow turbine flowmeter of the type shown in FIGS. 8-11 are adjusted for using different linear approximation (LA) values for different flow ranges within the low-flow region of operation of the flowmeter. The table has ten rows dividing the operation of the flowmeter up into flow ranges as shown in column 554. A greater or lesser number of flow ranges with different maximum and minimum flow rates could be used if desired or required. Experimental measurements with a prototype FIG. 8 flowmeter show that five different linear approximation values were required to correct for nonlinearities in the range of flow between 0.1 gpm and 100.0 gpm in order to obtain an accuracy of better than 1 percent over the full range of flows which could be measured by available equipment. The laboratory test equipment utilized to make the test measurements could only accurately measure flows in a calibrated manner down to 0.1 gpm. This limit is not believed to represent the lower flow rate limit of the turbine flowmeter system used in the present invention since the turbine still rotates at even lower flow rates such as about 0.05 gpm. Note that the first three gpm ranges in rows 1-3 (from 0.1 gpm to 1.5 gpm) required the same linear approximation value, namely 670,000 as shown in the first three entries of the column 566 in the table. It may be that with more sensitive test equipment the LA values for these ranges might need to be slightly different from one another. The next four flow ranges in rows 4 through 7 required four different linear approximation values ranging from 615,000 to 585,000. This last LA value proved sufficient for all higher ranges of flows indicated in rows 8 through 10 as well. Columns 558 and 560 of the FIG. 5 table list the vane frequency $f_V$ of the signal on signal path 232 from the sensor 38 and the corresponding maximum rate of rotation in revolutions per second of the turbine in the FIG. 8 flowmeter. As may be seen from the entry in row 7 of column 560, the nonlinearities become evident somewhere below five revolutions per second for the axial-flow turbine construction of the type shown in FIG. 8. The data in the FIG. 7 table was taken when 150 SSU hydraulic oil was being run through the FIG. 8 flowmeter. Further experimentation showed that the flowmeter was still quite accurate for hydraulic fluids having a viscosity between about 100 SSU and 300 SSU using the LA values of column 556.

As explained earlier, the microcomputer system 42 determines what flow range the rate of turbine rotation corresponds to by examining the value of the current count number (CCN). Column 562 lists the minimum CCN values for the several flow ranges, which are obtained by dividing the high-frequency time base frequency, which is 3 MHz, by the vane frequency listed in the same row of column 558. Column 564 in the FIG. 5 table shows the FIFO buffer size utilized to determine the average flow rate $F_A$ in a manner previously explained and may be readily varied depending upon the current flow range, for reasons previously explained. The entries of column 564 represent one possible set of FIFO size as a function of the ten different flow ranges listed in column 554. Further details about the specific signal processing steps utilized within the software of microcomputer system 42 to process and compensate for nonlinearities is given in our copending application Ser. No. 193,242 (see FIGS. 2 through 7 therein and the accompanying description thereof) for those who would desire further information. Tests show that the FIG. 8 flowmeter is very accurate without any compensation for nonlinearities between about 5.0 gpm to 100 gpm, that is, about 1.5 orders of magnitude, but become increasingly inaccurate as flow is decreased. By compensating for the nonlinearities as described above, the flowmeter is made highly accurate over at least an additional 1.5 orders of magnitude, thus increasing the effective high accuracy range of the axial-flow turbine flowmeters shown in FIGS. 8-11 from 1.5 orders of magnitude to at least about 3.0 orders of magnitude.

FIGS. 8 and 9 are front and side cross-sectional views of a preferred axial-flow turbine flowmeter 582 of the present invention which may be and preferably is used directly in place of the paddle-wheel flowmeter 32 shown in FIG. 1. Flowmeter 582 includes a substantially cylindrical turbine body 584 having a passage 586 all the way therethrough, a turbine assembly 590 having a nose cone 592 and a six-vane turbine 594 disposed within a substantially cylindrical bore 596 of passage 586, a vane sensor such as a magnetic proximity sensor 38, and an optional sensor enclosure 600, bolted to the body 584 by conventional threaded fasteners 602. The turbine assembly also includes an elongated cylindrical shaft 604 and a flow-stabilizing separator 606 having at least three equiangularly spaced longitudinally arranged blades 608 and a central section 610 having an elongated bore 612 therein into which the shaft 604 is press-fit. Turbine assembly 590 also includes bearing means 614 mounted on the shaft for rotatably supporting the turbine 594 on the shaft 604 as best shown in FIG. 10, which is a front view of the turbine 594 disposed in cylindrical bore 596. As shown in FIG. 10, the turbine 594 preferably has six vanes 618 integrally formed on a formed hub 620. A cylindrical bore 622 in the hub 620 is sized to allow bearing means 614 to be press-fit into the hub.

FIG. 11 shows a cross-sectional view of the separator 606, which is disposed in a slightly larger cylindrical bore section 624 of passage 586 in the turbine body 584. Separator 606 is held in the bore 624 by conventional retaining means 626 which is preferably a spring-steel wire retaining ring, which sits in a cylindrical groove 628 provided at the downstream end of bore 624.

As shown in FIGS. 8 and 9, the vane sensor 38 has an electrical cable 630 which curves around within chamber 632 and then exits through an optional electrical fitting 634 which includes an elastomeric grommet 636 tightened down about the cable 630 by rotation of a cap nut about the stationary conduit 640 which is threaded or otherwise attached to the enclosure 600.

The direction of fluid flow through the flowmeter 582 is indicated by the arrow 650. Conduit or pipe connections may be made into the turbine body 584 by any conventional or suitable means such as internal NPT or SAE threads indicated at inlet 652 or outlet 654 with a pipe 656 threaded therein. For high-pressure applications, any conventional or suitable fittings may be provided in place of the threaded inlet and outlet, including layered fittings. The selection of the clearance between the outer tips 668 of the vanes 618 and the cylindrical bore 596 in which turbine 594 rotates concentrically therein is very important to optimizing the design of flowmeter 582 for very low flow rates. This clearance is indicated as dimension 670 in FIG. 9 for flowmeters having a bore size of 0.625 inches and larger. We have found that a clearance of about 0.030 inch is optimal for 150 SSU oil and also works well for hydraulic fluid having a viscosity in the range of 100 SSU to 300 SSU. Further details as to the material and methods used to construct the flowmeter 582 are set forth in our copending application Ser. No. 193,242, and thus need not be repeated here.

FIGS. 12 and 13 show a preferred optical sensing means 700 for use with the turbine flowmeter 582. The optical sensor 700 includes an optical sensing head 702 having a fiber-optic cable 704 extending therefrom. The front end of the sensing head 702 is disposed in a complementary opening in an optical sensor housing 706. At a location remote from the sensor housing 706 is a conventional input/output connector 708 for the cable 704 which may be mounted on the printed circuit board 296 via a bracket 712 or other conventional fastening means. The I/O connector 708 includes two discrete optical conduits 714 and 716 which respectively may be inserted into openings in blocks 718 and 720. Block 718 represents a conventional opaque housing having the optical light source 344 shown in FIG. 4 therein, while block 720 represents a conventional opaque housing for photodetector 354 of FIG. 4. The design and construction of optical I/O connectors and blocks like connector 708 and blocks 718 and 720 are well-known in the fiber-optic cable art and need not be described here. In prototypes of the optical sensor 700, a ready-made cable assembly including optical sensor head 702, cable 704 and optical I/O connector end 708 including conduits 714 and 716 have been utilized. Such an optical cable assembly is available from Skan-A-Matic Corporation of Elbridge, N.Y. as Part No. F17312, among other sources. Cable 704 has a conventional sheath or protective covering rendering it opaque to the frequency of light emitted from the light source 344, which is preferably in the visible or infrared regions of the electromagnetic spectrum. Thus, it will be appreciated that the optical signal 368 is an electromagnetic signal. The optical sensing head 702 on the Skan-A-Matic assembly just mentioned includes a threaded metallic cylinder as a casing to facilitate its convenient mounting into a threaded fixture near the end of the object to be detected. Within the head 702 and cable 704 are the two optical fibers 362 and 364 for respectively carrying light beteen the source 344 to the end of the housing 702 and back up to the photodetector 354. This is shown more clearly in FIG. 13 which shows the beam of light 366 exiting from the end of the optical conduit 362, being reflected off of the tip 668 of the turbine vane 618 and light ray 368, which enters optical conduit 364 for delivery to photodetector 354.

The construction of the optical sensor housing 706 proved necessary and desirable since the end of the Skan-A-Matic optical head 702 was not designed to withstand moderate or high hydraulic pressures. The optical sensor housing 706 includes a rigid casing 740 having a large portion 742 with a hexagonal cross-section for easy manipulation by a wrench and a threaded cylindrical section 744 for screwing into a corresponding threaded opening 746 in the turbine body 584 made to receive the portion 744 and located directly adjacent and nearly tangent to the turbine 594 as shown in FIG. 13. The casing has an elongated hole 750 therethrough with first, second and third regions 752, 754 and 756 of differing nominal cross-sectional areas with the casing having a shoulder 760 at the boundary between the first and second regions and another shoulder at the boundary between the second and third regions. Within the first region 752 is securely mounted a protective window 764 as shown. The window 764 is made at least primarily of optically transparent material resistant to thermal shock such as Corning Code 7740 glass, more popularly known as Pyrex glass. The window 764 has first and second conventionally polished surfaces 766 and 768. The glass window 764 is approximately 0.125 inches thick and has a diameter of about 0.25 inches. The end of the threaded portion 744 may be rolled or pressed to form a small, continuous or intermittent lip 772 to retain the glass 764 within the first hole region 752.

The optical sensor housing 706 is also preferably provided with two elastomeric seals 776 and 778 located at the inner shoulder 760 and outer shoulder 780 of the casing 740. The seals are preferably O-rings made of a resilient, deformable, substantially incompressible material such as Viton. The O-ring or seal 776 serves a dual purpose. In addition to helping prevent leakage around the protective window 764, the O-ring 776 also helps cushion the glass as it contacts the shoulder 760, especially when high-pressure fluid is bearing against the window 764 from the cylinder bore 596 side of the window. The side of the protective window 764 which has the optically polished surface has an annular recess 784 ground into it whose inner diameter is greater than the diameter of the hole region 754 up above. Thus, when the window 764 tries to move upward, the polished surface 768 contacts the metal shoulder 760 along its periphery, and the seal 776 helps cushion the glass 764. Further details about the construction and function of the O-rings and glass 764 are set forth in our copending application Ser. No. 193,242, and thus need not be repeated here.

FIG. 14 is an illustrative graph showing a trace 800 produced by the x-y plotter 52 when the FIG. 1 system 24 operates in its automatic test mode and thereby provides a graphical hard-copy on paper or mylar testing the typical servo valve 80. For the graph shown, the input current to the torque motor of the servo valve had a range from −100 milliamps (mA) to +100 mA and a maximum flow rate of 16 gpm. The horizontal axis represents the independent variable, namely the input current provided to the servo valve 80, while the vertical axis represents the hydraulic flow rate measured by the microcomputer system 42 via the flowmeter 32 and dedicated signal processing circuitry 44. The servo valve analyzing system 24 when operated in its automatic test mode provides a very accurately measured and reproducible plot of the actual performance of the servo valve 80 under test as the digital electronic controller 30 cycles the servo valve 80 at least once through substantially its full range of operation by automatically varying the input command signal, namely the input current to the pilot operator 214, over a significant range of possible input command values, preferably the entire normal input range for the servo valve 80 being tested.

The microprocessor 142 supervises the overall operation of the system 24 in the automatic test mode and obtains from the EPROM 150 the instructions from a stored computer program stored there specifies the sequence of steps to be carried out in predetermined order in the automatic test mode. Briefly, the automatic test mode starts with the current at 0.0 mA with the hydraulic power supply 110 operating at the normal hydraulic test pressure, which may be selected to be at anywhere from several hundred psi to 2500 psi, as desired. The precise pressure is established by setting the internal pressure compensator or relief valve of the pump 114 to the desired level. The hydraulic system pressure can be read on system pressure gauge 86. Since shut-off valve 82 and loading valve 84 are open at this point, the normal leakage through the valve 80 in its closed center position will register as a flow. This flow rate may be 0.5 gpm as shown at point 802 in the graph. The microcomputer system 42 then begins to ramp up the current supplied to the pilot operator 214 of valve 80 incrementally with time in very small steps which causes the flow to ramp up as shown by portion 804 of the curve. As will be further explained, the size of the increments of current delivered to operator 214 is determined by calculation or by predetermined values in the stored program. For reasonable accuracy, we like to utilize at least 25 steps between 0.0 mA and the nominal maximum rated current value of the valve. Fifty to 100 steps are preferably used for better accuracy, and precisely how many steps are used depends upon the resolution of the equipment, the speed of the automatic test desired, etc. When the current reaches its maximum at point 808 on the FIG. 14 graph and begins incrementing back down toward zero, the typical servo valve 80 exhibits hysteresis so that the hydraulic flow rates produced by decreasing current levels are somewhat higher than the flow rates produced by the same current levels when the current is rising, as shown by the differences between trace portion 810 in comparison to portion 804. At point 814, the input current has reached 0.0 mA and then begins to go negative in an incremental fashion. As the current to operator 214 becomes increasingly negative, typical valve 80 produces a curved portion 816. The peak flow is reached at point 818 on the graph. As with positive currents, the valve 80 exhibits hysteresis as the current is increased from its most negative value at point 818. Thus, the hydraulic flow achieved is somewhat greater as shown by trace portion 820 than it is for trace portion 816.

Those skilled in the art of electrohydraulic servo valve design and/or repair are aware of how to interpret graph 800 shown in FIG. 14 and determine therefrom the type of problems, if any, the valve 80 under test has. For example, the amount of leakage flow indicated at 0.0 mA is an indication of whether leakage is excessive. As a second example, if the entire trace 800 is offset to the left but otherwise looked good, this would indicate an unbalanced spool which is offset in the negative current direction in servo valve 80 and the need to re-calibrate the valve. Similarly, other problems, such as dirty valves, damaged spools, plugged orifices or air gaps and the like, can often be determined by examination by the x-y trace produced from the plotter 52 when a servo valve is tested by the system 24. Moreover, a trace made for a particular servo valve known to be clean, fully functional and properly calibrated can later be used as a benchmark against which to compare a similar trace made under identical test conditions for the same valve or the exact same model of valve which is being tested. The differences in the two traces would of course indicate possible problems and give the valve repairman a very good idea of just what is wrong with the valve under test. Such comparison and interpretation of traces similar to the FIG. 14 trace is well understood by those skilled in the art and need not be further discussed here. Further information about the characteristics of electrohydraulic servo valves and various graphs and traces used to analyze the characteristics of such valves can be found in J. E. Johnson, ELECTROHYDRAULIC SERVO SYSTEMS, copyright 1977 by Penton Publishing, Inc. of Cleveland, Ohio.

FIG. 15 is a table 830 illustrating various preprogrammed ranges of currents and flows which may be selected by a person using the servo valve analyzing system 24 of the present invention. Column 832 indicates that there are thirteen different graphs with the maximum current for each graph in milliamps being specified in column 834 and the maximum gpm for each graph being specified in column 836. The values of the current specified in column 838 represent values which may be keyed in via keypad 48 at a specific time in the operating sequence by the person using the SVA system 24, as will be explained shortly. The values of maximum current and maximum flow specified in the different graphs of the table 830 correspond to commonly used ranges of current and flow rates for various commercial valves. SVA system 24 may be used to test a wide variety of different types of electrohydraulic servo valves, such as those made by the following companies: Moog (e.g., Moog Series 62, 72, 76 and 78); Schank Pegasus (e.g., Models 121, 122, 131, 140, 160 and 180); Sperry Vickers (many models); Honeywell (many models);

Cincinnati Milacron (many models); and Rexroth (many models). To test these different valves, it is simply necessary to have the proper adapter plate 80 for the valve to be tested and the proper electrical connector 290 to hook up the electrical power from the servo driver circuit 50 to the valve under test. The necessary adapter plates and connectors for these different valves can be obtained from Servo Craft, Inc. of Rochester Hills, Mich. Alternatively, necessary adapter plates can easily be machined or otherwise fabricated since the mechanical dimensions required for making hydraulic connections to the servo valve to be tested is available as published data from the servo valve manufacturers.

Having thus described the mechanical, electrical and basic operating characteristcs of the SVA system 24 of the present invention, a detailed description of the method of using the servo valve analyzer 24 and the operational functions of the software used to drive the microcomputer system 42 in connection with FIGS. 16-21 will now be given.

FIG. 16 illustrates the distinct phases during the use of the FIG. 1 system. The first step in using the system 24 is to connect the hydraulic hoses 126 and 128 between the hydraulic power supply 110 and the fittings attached to conduits 96 and 128 on plate 252 of control panel 250 shown in FIG. 2. This step is indicated by hexagonal block 830 in FIG. 16. Next, as indicated by block 832, an appropriate adapter plate 300 for the servo valve 80 to be tested is installed along with the servo valve, which is connected by connector 290 and cable 294 to the test connector 292, as shown in FIG. 2. Thereafter, the system is initialized as indicated in block 834, which is further explained in FIG. 17. As indicated in blocks 836 and 838 in FIG. 16, the system 24 may be operated in either manual mode or automatic test mode, both of which will be further explained. As indicated by dashed lines 840, 842 and 844 in FIG. 16, the manual mode of operation and/or the automatic test mode of operation may be repeated as desired. Once the testing of a particular servo valve 80 is complete, the system 24 may be set up to test another valve. As indicated in hexagonal block 850, this is accomplished by shutting down the electronic controller 30 via on-off switch 274, closing the shut-off valve 82 and loading valve 84 and thereafter repeating the sequence of steps beginning with block 832, as suggested by dotted line 852 which returns to block 832 in FIG. 16.

FIG. 17 explains the initialization of the system. This is done by turning on the servo valve analyzer 24 via on-off switch 2524 and turning on x-y plotter 52 which preferably has its own separate 120-volt AC power source. This step is indicated in block 854. Turning on the servo valve analyzer 224 powers up the microcomputer system 42 which, after completing conventional self-diagnostic routines, sets two software flags, namely the C Flag and the D Flag to 0 and 1 respectively, as indicated in block 854. Next, shut-off valve 82 and loading valve 84 are opened by the user as indicated in block 858, and the hydraulic power supply 110 is allowed to run until the hydraulic oil 120 in the reservoir 112 comes up to its normal operating temperature, which is preferably thermostatically controlled to a particular set point, such as 100 degrees, at which all servo valve tests will be conducted. Although it is not deemed critical to conduct all tests at the same temperature or with the same viscosity hydraulic oil, clearly it is beneficial to attempt to do so. This warm-up delay is indicated by diamond 860. This completes the initialize system sequence, and triangle 862 indicates that the sequence of operation should return back to the main sequence of operation in FIG. 16 at point 864 just before block 836. FIGS. 18-21 make extensive reference to various software flags and symbols. An explanation of the software flags and symbols is provided in Tables II and III below.

TABLE II—SOFTWARE FLAGS & MEANINGS THEREOF

C Flag = Completion Flag (0 = less than ¾ of way through auto test cycle; 1 = ¾ or more of way through auto test cycle)

D Flag = Direction Flag (0 = value of $I_P$ being decreased; 1 = value of $I_P$ being increased)

L Flag = Limit Flag (0 = values of $I_P$ and $O_C$ are within maximum allowable servo error limit $I_L$ of one another; 1 = values of $I_P$ and $I_C$ are different from one another by more than maximum allowable error limit $I_L$ exceeded)

M Flag = Match Flag (0 = values of $I_P$ and $I_A$ are unequal by more than $I_T$; 1 = values of $I_P$ and $I_A$ are matched or equal to one another, within tolerance $I_T$)

P Flag = Passes Flag (0 = SV Driver Routine invoked less than PMAX times; 1 = SV Driver Routine invoked PMAX times without achieving M Flag = 1)

TABLE III

| SOFTWARE FLOWCHART PARAMETER LEGENDS | |
|---|---|
| SYMBOL | DESCRIPTION OF PARAMETER |
| $F_A$ | = Flow Rate, Actual (Ave.) |
| $F_S$ | = Flow Rate, Set Max. (for Plot) |
| $I_A$ | = Current Value, Actual (from A/D 168) |
| $I_C$ | = Current Value, Command (to SV Driver via D/A 164) |
| $I_i$ | = Current Value, Increment (for Plot) |
| $I_L$ | = Current Value, Limit (on Allowed SV Driver Error) |
| $I_P$ | = Current Value, Present (Command - for Plot) |
| $I_R$ | = Current Value, Increment (for SV Driver) |
| $I_S$ | = Current Value, Set Max. (for Plot) |
| $I_T$ | = Current Value, Tolerance (Allowed Deadband) |
| PMAX | = Passes, Maximum (No. of, Allowed Thru SV Driver Routine) |
| P-CTR | = Pass Counter (Present Value of, Equals No. of Passes Through SV Driver Routine without M Flag being set to 1) |

FIG. 18 is a flowchart showing the normal sequence of operations performed by the user during the manual mode of operation. Initially, the user presses and holds the RC key of keyboard 48, which causes the software variable $I_P$ to increase in the positive direction. This results an increase in voltage on conductor 210, which is the output from the D/A converter 164, which steadily increases the magnitude of the current supplied to the torque motor 214 by the servo driver ciruit 50. Microcomputer system 42 substantially continuously monitors the actual current and hydraulic flow rate during this time and contemporaneously displays them on displays 47 and 46, as indicated by block 868 in FIG. 18. If the user should release his finger from the RC key, the value of $I_P$ is maintained. To return the current being supplied to the torque motor 214 to zero, the user must press and release the zero key as indicated in block 870. Microcomputers system 42 then substantially continuously decrements the value $I_P$ until it is zero, as indicated in block 872. During this time, and at all other times during manual mode, the actual current and hydraulic flow rates are displayed and are substantially continuously updated with new values as needed to reflect the true conditions sensed through the feedback amplifier 202, A/D converter 168, flowmeter 32 and signal processing circuitry 44.

The user can then change the direction in which the current is heading by pressing and releasing the "+/−" key as indicated in block 874. Microprocessor 142 in response sets the D Flag to zero per block 876. By pressing and holding RC key again, this ramps up the value $I_P$ in the negative direction per block 880 incrementally and in a substantially continuous fashion until the user releases the RC key, at which time the $I_P$ value is maintained. To return the current being supplied to the servo valve 214 to zero, the user must press and release the zero key. Block 882 then indicates the value $I_P$ is returned to zero incrementally in the same manner done with respect to block 872. This completes the manual mode sequence as indicated by return triangle 884.

Figures 19, 21:
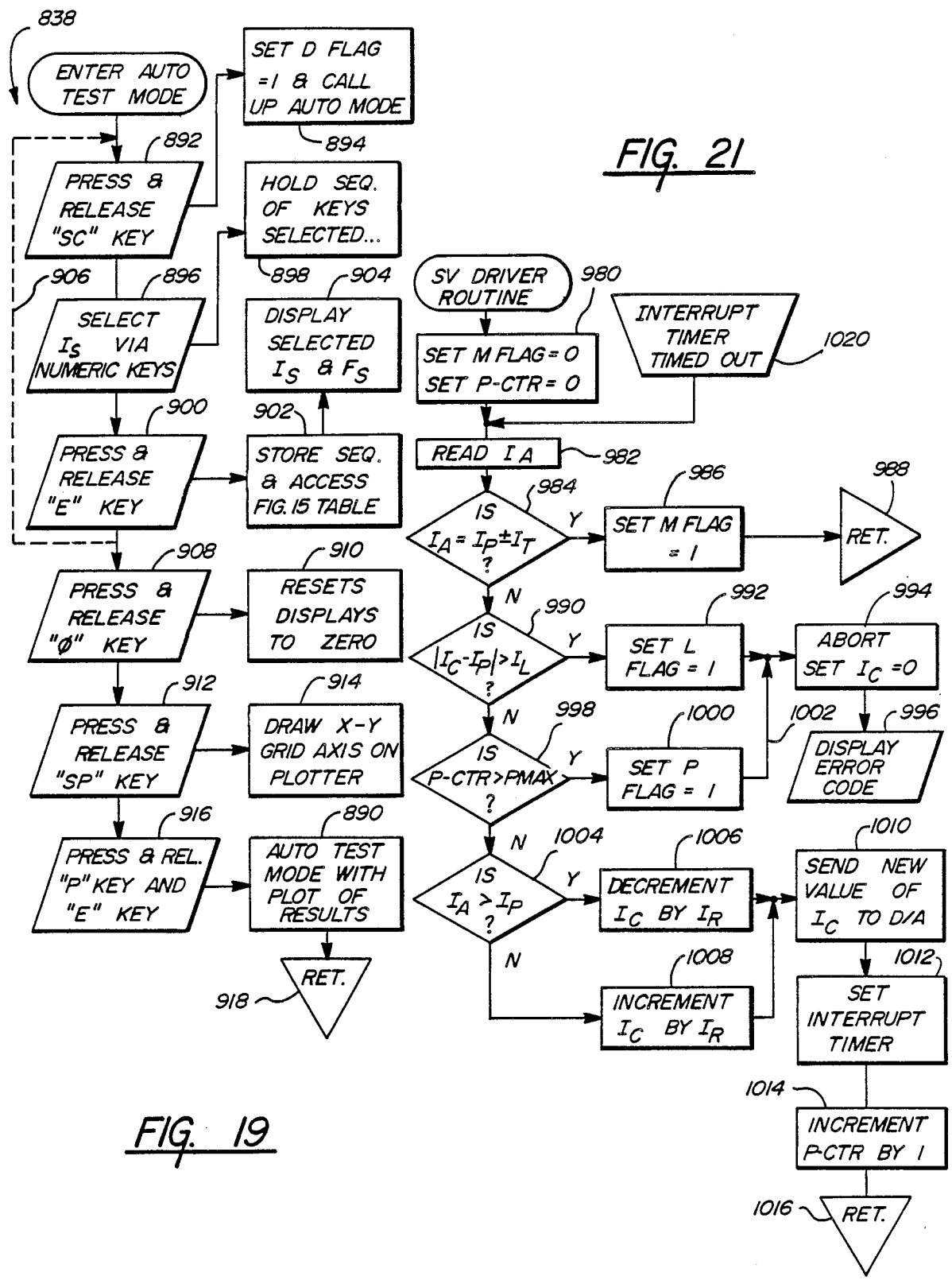
Figure 20:
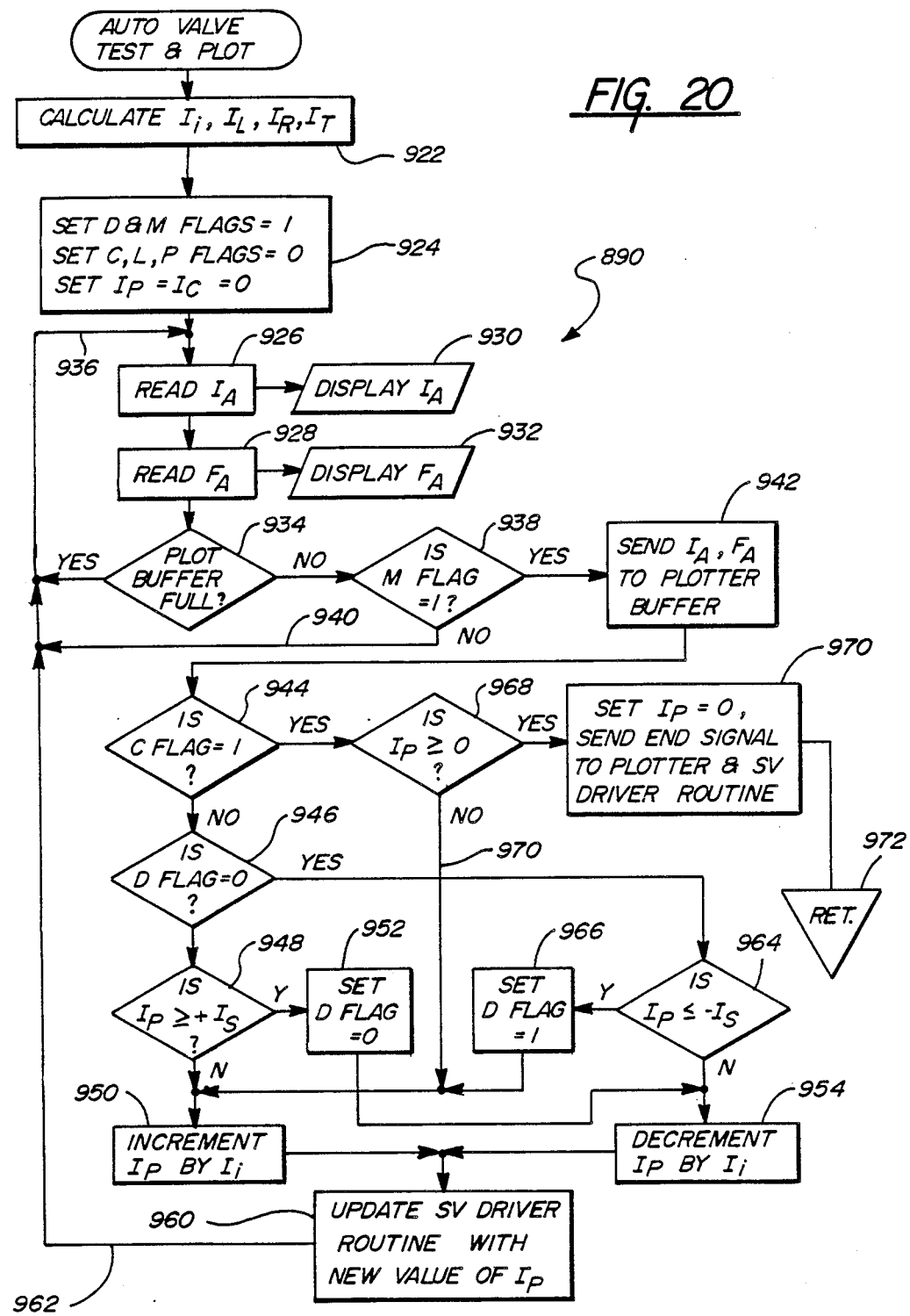

FIG. 19 is a flowchart indicating the steps the user must perform in order to enter the auto test mode, which is the last rectangle 890 on FIG. 19. FIGS. 20 and 21 actually illustrate what happens functionally within the software during the auto test mode 890. As shown in FIG. 19, the user begins to enter the auto test mode by first pressing and releasing the SC key as indicated in block 892. Per block 894, this sets the D Flag to 1. Next, as indicated by block 896, the user selects or punches on the numeric keys to indicate the desired maximum current $I_S$ per block 896. The sequence of strokes on the numeric keys are held in a buffer as noted in block 898. Then the user presses and releases the E key to enter, that is, store, the sequence of keystrokes he selected and cause the system 42 to interpret the value of $I_S$ entered as corresponding to one of the thirteen desired graphs indicated in FIG. 15. In particular, the value of $I_S$ is interpreted in accordance with the entries in the right-most column 838 of the FIG. 15 table as indicated by block 902 in FIG. 19. The maximum current and maximum gpm associated with the particular graphs which has been chosen is then displayed as noted by block 904 in FIG. 19. This allows the user to verify that the graph and maximum current he has chosen is appropriate for the particular servo valve 80 which is to be tested during the automatic test mode. If the user is unhappy with his choice of graphs or simply wishes to see what else is available, he may repeat the foregoing steps as indicated by dotted line 906 which returns the sequence of operation to block 892. In other words, if after block 900 the user presses the SC key, the system 42 knows to return to block 892. If the user presses and releases the zero key, as indicated in block 908, the system 42 resets displays 46 and 47 to zero, as indicated in block 910. Thereafter, if the user presses and releases the SP key, in accordance with block 912, system 42 causes the plotter 52 to automatically draw the appropriate horizontal and vertical x-y grid axes on the paper within the plotter along the lines shown in FIG. 14. The numeric values output along the x and y axes are appropriately scaled for whatever the maximum current and flow rates are for that particular graph number in accordance with the FIG. 15 table. Next, as indicated in block 916, the user presses and releases the P key and the E key in sequence to place the servo valve analyzer 24 in the automatic test mode which plots the results of the test as it goes as indicated in block 890 in FIG. 19. Once the automatic plotting is complete, the system 42 automatically turns off the automatic test mode before proceeding to return triangle 918 which leads back to FIG. 16 at point 920.

FIG. 20 shows a detailed flowchart of the general sequence of functional steps carried out during the automatic test mode of operation of the SVA system 24. Once entering the auto test mode, the microprocessor 142 calculates (or obtains from a pre-programmed storage table) the value of the current increment $I_i$ to be used to update the value of the command current $I_C$ provided to the servo driver circuit 50 via the D/A converter 164. For example, if the maximum current $I_S$ of the valve 80 is 400 mA, and 100 increments are desired from 0 to 400 mA, the value of $I_i$ will be 4 mA. As a second example, if the maximum current $I_S$ of the valve 80 is 50 mA and 50 increments are desired, the value of $I_i$ will be 1.0 mA. The specific number of increments deisred for a given range of possible values for $I_S$ is preferably stored as a predetermined parameter in the program in memory 150.

The foregoing step of calculation $I_i$ is indicated by block 922 in FIG. 20. Block 922 also indicates that processor 142 calculates values for the variables $I_L$, $I_R$ and $I_T$ at this time. These three variables and the three flags, L, M and P, are also used in connection with the software routine that controls the servo driver circuit 50, namely the SV driver routine. The P Flag is an error flag which is set to the value 1 only when the closed-loop servo system after a number (PMAX) of passes is unable to make the value of the actual current value $I_A$ converge properly to the desired or present current value $I_P$, as will be further explained in FIG. 21. The M Flag is set to 1 by the SV driver routine when the value of $I_A$ is equal to the value of $I_P$ within an acceptable tolerance of $+/-I_T$. $I_T$ and $I_R$ are variables whose values are calculated from the value of $I_i$, such as one-sixth and one-third of $I_i$ respectively. The values of $I_R$ and $I_T$ are chosen or rounded off as necessary so as not to exceed the resolving power of D/A and A/D converters 164 and 168 and to allow sufficiently quick convergence of the value of $I_A$ with the desired value $I_P$ without overshoot. PMAX is the maximum number of passes allowed through the SV driver routine to obtain such convergence, before giving up and setting the P Flag. The particular values for $I_i$, $I_T$, $I_R$ and PMAX chosen are not critical so long as the SV driver routine and circuit 50 are capable of faithfully and reproducibly causing the measured current supplied to ramp up and ramp down over the full input current range of the valve 80 being tested, so that useful, reliable and reproducible x-y plots of value input current and resulting flow rate through the valve 80 under the test are obtained. Those skilled in the art should also recognize that the particular software algorithms and software organization described here in FIGS. 18 through 21 may be changed or replaced with functionally equivalent software which can even be implemented on different electronic microcomputer hardware without departing from the scope of the broader aspects of the present invention.

Next, the microcomputer 140 sets the various flags as indicated in block 924 and sets the present current value $I_P$ and the command current value $I_C$ to zero. The microcomputer 140 then reads the actual current value $I_A$ and actual hydrualic flow rate $F_A$, as indicated by blocks 926 and 928 and presents both of these values to the user via displays 47 and 46 as indicated by blocks 930 and 932 in FIG. 20. The values $I_A$ and $F_A$ may be average values computed from serveral successive readings as previously explained.

Microprocessor 142 then checks to determine whether the plot buffer in x-y plotter 152 is full, as indicated by decision diamond 934. If the answer is "yes," the sequence is looped back to block 926, as indicated by line 936. If the plot buffer is not full, the M Flag status is checked by processor 142, as indicated by decision diamond 938. If the M Flag is zero, the software flow loops back to block 926 via return path 940 and 936. If the M Flag is 1, this means that the actual current value $I_A$ agrees with the desired present current value $I_P$ so, as indicated in block 942, processor 142 sends the present values of $I_A$ and $F_A$ to the plotter buffer to serve as points on the trace or plot to be drawn by x-y plotter 152.

Next, as indicated by decision diamond 944, the status of the C Flag is checked. The C Flag is set to 1 only after the three-quarters point of the trace (point 818 on the FIG. 14 graph) is reached. Accordingly, the C Flag will initially be zero, and the software flow proceeds to decision diamond 946 which checks the status of the D Flag. The D Flag is initially set to 1 by block 924 above. Control thus proceeds to diamond 948 which determines whether the present current value $I_P$ has reached the positive current limit, $+I_S$, which occurs at point 808 on the FIG. 14 graph. If this maximum had not been reached, control passes to block 950, and the value $I_P$ is incremented by the value $I_i$. If at decision block 948 the answer is "yes", the D Flag is set to zero, as indicated in block 952, and the present current value $I_P$ is decremented by the value $I_i$, as indicated in block 954. Blocks 950 and 954 both lead to block 960 which updates the SV driver routine with the new value of $I_P$. The SV driver routine, which is explained in detail in FIG. 21, executes those instructions necessary to ensure that the actual current value $I_A$ produced by the servo driver circuit 50 matches the new value of $I_P$. After block 960, control returns, as indicated by lines 962 and 936, to block 926, and the foregoing sequence is repeated.

When the decision diamond 946 is reached and the D Flag is zero, indicating that the changes to the value of $I_P$ are headed in the negative direction, decision diamond 964 is reached. This block checks to see if the desired current value $I_P$ has reached the negative current limit, namely, $-I_S$. If not, control passes to block 954. If it has been reached, the C Flag and D Flag are both set to 1 as noted in block 966, and control passes to block 950 as shown.

Thereafter, the automatic plot made continues to loop through the sequence of blocks shown in FIG. 20 repeatedly. However, at decision diamond 944 the answer is now "yes," so control passes to decision diamond 968 which checks to see whether the present current value has been incremented back to zero. If it has not, control follows path 970 and the looping through the FIG. 20 sequence continues. If $I_P$ has reached or exceeded zero, this indicates that the x-y plot is complete. When the plot is complete, the variable $I_P$ is set to zero and appropriate ends signals are sent to the plotter and to the servo driver routine, thus ending the auto plot mode. Return triangle 972 indicates control passes back to point 920 in FIG. 16 beneath block 838.

FIG. 21 provides a detailed functional description of one possible implementation of the SV driver routine. When the SV driver routine is entered from block 960 of FIG. 20. control first passes to block 980 which sets the M Flag and pass counter to P-CTR zero. Next, the actual current value $I_A$ is read at block 982. Then, decision block 984 checks to determine whether the actual current value $I_A$ matches the current value of $I_P$ within the tolerance by the value of $I_T$. If the answer is "yes," the M Flag is set to 1, as indicated in block 986, and through triangle 988, control passes back to path 962 in FIG. 20. If the answer to the question in block 984 is "no," the software checks to see whether the absolute magnitude of the difference between the command current value $I_C$ minus the desired value $I_P$ is greater than the allowed amount of error specified by variable $I_L$. If "yes," the L Flag is set to 1, as indicated in block 992. The auto plot mode is aborted and the command current $I_C$ is set to zero, as indicated in block 994, and an appropriate error code may be displayed on displays 46 and/or 47, as indicated by block 996. If the answer to question 990 is "no," the microprocessor 142 then checks to determine whether the value of the pass counter is greater than the value of PMAX, as indicated by decision block 998. If "yes," then it is presumed that the SV driver routine is unable to cause the actual current value $I_A$ to converge upon the desired value $I_P$. Therefore, the P Flag is set to 1, as indicated in block 1000, and control passes along path 1002 to block 994. If the answer to question 998 is "no," control passes to block 1004 which determines whether the actual current value $I_A$ is greater than the present current value $I_P$. If "yes," the command current value $I_C$, which determines the output voltage of D/A converter 162, is decremented by the value $I_R$, as indicated in block 1006. If the answer to the question in block 1004 is "no," the software assumes that the actual value $I_A$ is less than the present current value $I_P$ and accordingly increments the command current value $I_C$ by the value $I_R$, as indicated in block 1008. After the step in block 1006 or block 1008 is completed, the processor 142 then sends the new value of $I_C$ to the D/A converter 164, as indicated in block 1010. This value may be scaled as necessary to allow for the fact that the output D/A converter 164 is a voltage and not a current, in a manner well understood to those skilled in the art.

To ensure that the microcomputer system 140 regularly attempts to update the command current value $I_C$, but does not do so too frequently, the microcomputer system 142 preferably includes a conventional hardware interrupt timer 144, as shown in FIG. 1, or has the software illustrated in FIGS. 20 and 21 set up in a manner which ensures that the SV driver routine is passed through by the microcomputer at appropriate intervals, i.e. frequently enough but not too frequently. Note that at very low flow rates, the vane frequency $f_V$ is very low, and accordingly the minimum interval of time during which the actual flow rate value $F_A$ is acquired is necessarily longer than the minimum interval of time at which the value $F_A$ is acquired at higher flow rates, since the acquistion of an accurate actual flow rate value $F_A$ will take considerably more time with lower flow rates. By exercising routine skill in writing the software, these timing considerations may be properly handled and need not be further discussed here beyond what is set forth herein.

As indicated in FIG. 21 at block 1012, the interrupt timer 144 is set after the new value of $I_C$ has been sent to D/A converter 164. The time interval set on timer 144 can be determined experimentally and may be 25 to 60 milliseconds, for example. After setting the interrupt timer 114, the pass counter incremented by 1, as indicated in block 1014. Thereafter, command is returned, as indicated by triangle 1016 to path 962 in FIG. 20.

Depending upon the values of variables $I_R$ and $I_T$, and the performance of servo driver circuit 50 and the electrical characteristics of valve 80 under test, one, two, three or more passes through the FIG. 21 SV driver routine may be necessary in order to obtain a match between the values of $I_A$ and $I_P$, as indicated in decision diamond 984. Once the interrupt timer 144 has been set, it is automatically decremented with the passage of time until it times out. When timer 144 times out, the SV driver routine is re-entered, as indicated by trapezoidal block 1020, in response to the interrupt generated by timer 144. In this manner, the SV driver routine is entered promptly after an appropriate interval of time, namely the interval of time set initially at block 1012 as previously described. Entry into the FIG. 21 routine via block 980, which can only be entered from block 960 in FIG. 20, is prevented by the decision diamond 938 which checks the status of the M Flag. As long as the M Flag is zero, the current $I_P$ value cannot be changed, and the SV driver routine is only enterable through block 1020 when the interrupt timer 144 times out. Those skilled in the art should appreciate that the use of a conventional interrupt timer 144 is one way to achieve proper frequency of the SV driver routine. Other techniques, including techniques implemented totally within the software, can also be utilized to accomplish the same result.

Armed with the foregoing functional description and illustration of the software for microcomputer system 140, as illustrated in all of the figures, particularly FIGS. 7 and 14–21, those skilled in microcomputer programming art will be readily able to prepare computer programs for the microcomputer system 42. Therefore, there is no need to discuss further the software or its operation here. Those in the art should appreciate that the steps or sequence of operations set forth in the above description or illustrated in the figures may be rearranged or implemented in other ways, without departing from the present invention, as long as the necessary basic functions described above end up being performed.

The foregoing detailed description shows that the preferred embodiments of the present invention are well-suited to fulfill the objects above-stated. It is recognized that those skilled in the art make various modifications or additions to the preferred embodiments chosen here to illustrate the present invention without departing from the spirit of the present invention. For example, turbine flowmeters of different sizes and styles beyond those described herein may be utilized in the present invention, provided, however, that the digital electronic signal processing techniques which make the electronic flowmeter used herein so accurate are still used. As a second example, the servo valve analyzing system 24 of the present invention may be mounted in a larger instruments panel on wheels or into a recess provided in the top of a work table. As a third example, the accuracy and range of the servo valve analyzing system 24 may be further extended or may be reduced somewhat depending upon the particular needs of a user or class of users. Accordingly, it is to be understood that the protection sought and to be afforded hereby should be deemed to extend to the subject matter defined in the appended claims, including all fair equivalents thereof.

We claim:

1. A system for testing the operation of an electrohydraulic servo valve, operable in a fully automatic test mode, by applying an electrical input command signal to the servo valve and monitoring the hydraulic performance of the servo valve in response thereto, the system comprising:
    means for making hydraulic connections to the servo valve being tested;
    turbine flowmeter means for accurately sensing hydraulic fluid flow rate over substantially the full dynamic range of the servo valve being tested;
    means for accepting operator input commands which specify at least one test parameter and initiate the automatic test mode;
    servo amplifier means for producing the electrical input command signal;
    connection means for supplying the command signal to the servo valve; and
    digital electronic control means for controlling the overall operation of the system in the automatic test mode, which attempts to cycle the servo valve at least once through substantially its full nominal range of operation by automatically varying the input command signal over a significant range of possible input command signal values for the servo valve being tested.

2. A system as in claim 1, wherein the digital electronic control means includes at least one microprocessor supervising the overall operation of the system in the automatic test mode, and one memory means for storing a computer program specifying a sequence of steps to be carried out in a predetermined order in the automatic test mode.

3. A system as in claim 2, further comprising:
    first digital latch means associated with the flowmeter means for holding each successive value corresponding to each sensed hydraulic fluid flow rate until the microprocessor has acquired same;
    second digital latch means associated with the servo amplifier means for holding a digital value corresponding to a desired magnitude of the electrical input command signal specified by the microprocessor; and
    a common bus providing a multiple conductor signal pathway between the first digital latch means, the second digital latch means and the microprocessor.

4. A system as in claim 1, the turbine flowmeter means including:
    a flowmeter body having a passage therethrough and a turbine having at least three blades disposed at least partially within the passage for rotation as fluid whose flow rate is to be measured impinges on the vanes;
    vane detector means for generating an electromagnetic flow signal whose period corresponds inversely to the rate or rotation of the turbine in response to the presence and absence of the vanes in a predetermined location within the body; and
    dedicated signal processing means for measuring the period of the electromagnetic flow signal by selectively counting pulses of a high-speed time base accumulated during such period.

5. A system as in claim 4, wherein the turbine is an axial-flow turbine and the flowmeter means includes digital processing means for compensating for a predetermined nonlinearity if any between the rate of rotation of the turbine and the rate of fluid flow through the body, at least in a low-flow region of operation of the flowmeter means.

6. A system as in claim 5 which is compact and portable, further comprising:
hand-holdable luggage means for enclosing the system for portage between different test locations, and wherein the digital processing means of the flowmeter means is part fo the digital electronic control means.

7. A system as in claim 1, wherein the means for accepting includes a keypad having at least a first group of several alphanumeric keys and a second group of at least a plurality of control function keys, and the system further comprises:
means for visually displaying the magnitude of the electrical input command signal and the magnitude of the hydraulic fluid flow rate.

8. A system as in claim 1, further comprising:
plotting interface means for transmitting digital data and control signals to x-y plot means so that current and flow measurement made during the automatic test mode may be permanently recorded on a visual presentation means.

9. A system for testing an electrohydraulic servo valve by generating an electrical command signal for the servo valve and monitoring the resulting hydraulic performance of the servo valve, the system comprising:
means for generating the electrical command signal in a manner that varies with respect to time and which can be accurately repeated in subsequent tests;
means for applying the command signal to the servo valve;
means for sensing at least one characteristic of the hydraulic performance of the servo valve in response to the applied command signal;
digital electronic control means for controllling the overall operation of the system during a test of the valve involving operating the valve through at least one dynamic operating region of the valve; and
plot means for graphing, on permanent record means, data indicating the relationship between various values of the input command signal during the test and the one sensed characteristic of hydraulic performance of the servo valve in response thereto, and wherein
the means for generating and the means for sensing are operated in a sufficiently accurate manner so that the graphed data will normally be highly uniform between successive tests of the same valve performed within a short interval of time and under substantially identical conditions.

10. A system as in claim 9, wherein:
the digital electronic control means includes at least one microprocessor for supervising the overall operation of the system in the automatic test mode and at least one memory means for storing a computer program specifying a sequence of steps to be carried out in a predetermined order in the automatic mode of operation and for storing a control program and selected parametric data for configuring the system to produce current and flow measurements on an x-y plot having preselected scales of current and flow rate.

11. A system as in claim 10, further comprising:
input means for receiving commands and desired command values from an operator of the system, with one such command being a selection of desired parametric data for configuring the system to produce an x-y plot of a selected one of the several sets of scaling factors.

12. A system as in claim 9, wherein:
the electrical command signal is a current signal varying between about 0.0 milliamps and a predetermined maximum absolute value of less than or equal to about 400 milliamps,
the one sensed characteristic of the hydraulic performance of the servo value is the rate of hydraulic fluid flow through the valve, and the means for sensing includes a turbine flowmeter having a turbine with a plurality of vanes and vane detecting means for generating electromagnetic flow signal whose period corresponds inversely to the rate of rotation of the turbine in response to the presence and absence of the vanes in a predetermined location within the flowmeter;
the plot means includes a plotter for generating a graph having an a-axis and da y-axis, and the permanent record means is a flat durable sheet, and
the one dynamic operating region of the valve includes at least one point where the command signal has a magnitude substantially equal to zero.

13. A system as in claim 9, which is portable, further comprising:
a plotter for generating a graph having an x-axis and a y-axis which forms at least part of the plot means, and
plotter interface means for transmitting digital data and control signal to the plotter.

14. A high-accuracy, easy-to-use, transportable system which is operable in a fully automatic mode for testing the operation of an electrohydraulic servo valve by generating a varying electric input command signal and monitoring and recording hydraulic performance of the servo valve in response to the varying command signal, the system comprising:
manifold means for making temporary hydraulic connections to the servo valve;
electrical connector means for making electrical connection to at least one electrical input lead of the servo valve;
turbine flowmeter means for accurately sensing fluid flow over the full dynamic range of the servo valve, including very low flows, the flowmeter means including a flowmeter body having a passage therethrough and a turbine having at least three blades disposed at least partiallly within the passage for rotation in response to fluid whose flow rate is to be measured impinging on the vanes, and vane detector means for generating an electromagnetic flow signal whose period corresponds inversely to the rate of rotation or the turbine as determined by the presence and absence of the vanes in a predetermined location within the body, and dedicated signal processing means for measuring the period of the electromagnetic flow signal by selectively counting pulses of a high-speed time base during such period;
keypad means for accepting operator input commands which specify at least one test parameter;
servo amplifier means for producing an amplified analog current signal to be input into the servo valve;
analog-to-digital means for providing a digital feedback signal whose value corresponds to the magnitude and polarity of the amplified current signal being supplied to the servo valve;

plotter interface means for transmitting data and control signals to x-y plot means so that current and flow measurements may be recorded on permanent visual presentation means; and centralized digital electronic controller means for automatically controlling the overall operation of the system in an automatic test mode which attempts to cycle the servo valve at least once through its full nominal range of hydraulic flows, the centralized means including at least one microprocessor and memory means for storing a control program and selected parametric data for configuring the system to produce current and flow measurements on an x-y plot having predetermined scales for input current and hydraulic flow rate.

15. A system as in claim 14, further comprising:
digital-to-analog conversion means for transforming a digital value representing a desired polarity and magnitude of the amplified signal into an unamplified electrical signal having an average DC value and polarity corresponding to that of the digital value, and wherein:

the servo amplifier means includes an amplifier circuit for amplifying the unamplified electrical signal to produce the amplified signal.

16. A system as in claim 15, wherein the amplified signal is an average DC signal which is accurately and repeatedly generated with respect to time in accordance with a programs stored in the memory means.

17. A system as in claim 16, further comprising:
digital bus means for substantially continuous high-speed acquisition of the current and flow data during the testing of the valve in automatic mode, including first latch means associated with the dedicated signal processing means for holding each successive current count number value corresponding to the length of the period of the electromagnetic flow signal until the microprocessor has acquired same, and second latch means associated with the analog-to-digital means for holding each successive value of the digital feedback signal until the microprocessor has acquired same.

18. A system as in claim 17, further comprising:
first multiple-digit display means for displaying, at least during the automatic testing of the valve, a first display value corresponding to one or more recent values of the present digital feedback signal; and second multiple-digit display means for displaying, at least during the automatic testing of the valve, a second display value corresponding to one or more recent values of the electromagnetic flow signal through the servo valve as measured via the flowmeter means.

19. A system as in claim 14, wherein the flowmeter means includes digital processing means for compensating for a predetermined nonlinearity if any between the rate of rotation of the turbine and the rate of fluid flow through the body at least in a low flow region of operation of the flowmeter means.

20. A system as in claim 19, wherein the digital processing means of the flowmeter means is part of the centralized digital electronic control means.

21. A system as in claim 14, further comprising:
x-y plot means for plotting, in visually discernable form on a permanent sheet medium, current and flow measurementls of the servo valve to be tested substantially simultaneously with the testing of the valve, the x-y plot means including means from receiving from the plotter interface means digital data corresponding to the values of the current and flow measurements to be plotted.

* * * * *